US012346415B2

(12) United States Patent
Li et al.

(10) Patent No.: US 12,346,415 B2
(45) Date of Patent: Jul. 1, 2025

(54) METHOD AND APPARATUS FOR LICENSE CREDIT MANAGEMENT

(71) Applicant: ARRIS Enterprises LLC, Suwanee, GA (US)

(72) Inventors: Cheng Li, San Diego, CA (US); Jinsong Zheng, San Diego, CA (US); Eric Brunnett-Lazarte, La Mesa, CA (US); Patrick Dizon, San Diego, CA (US); Fredelyn A. Benavidez, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 154 days.

(21) Appl. No.: 17/981,267

(22) Filed: Nov. 4, 2022

(65) Prior Publication Data
US 2023/0132958 A1 May 4, 2023

Related U.S. Application Data

(60) Provisional application No. 63/275,800, filed on Nov. 4, 2021.

(51) Int. Cl.
*G06F 21/10* (2013.01)
(52) U.S. Cl.
CPC .................. *G06F 21/105* (2013.01)
(58) Field of Classification Search
None
See application file for complete search history.

(56) References Cited

U.S. PATENT DOCUMENTS

| | | | |
|---|---|---|---|
| 7,681,245 B2* | 3/2010 | Walker | G06F 21/10 726/30 |
| 7,707,116 B2* | 4/2010 | Walker | H04L 63/10 705/59 |
| 7,844,572 B2* | 11/2010 | Walker | G06F 21/10 726/30 |
| 8,620,819 B2* | 12/2013 | Walker | G06F 21/10 707/948 |
| 8,635,309 B2* | 1/2014 | Berthiaume | G06F 16/17 717/172 |
| 10,242,017 B2* | 3/2019 | Berthiaume | G06F 21/57 |
| 11,573,830 B2* | 2/2023 | Bartfai-Walcott | G06F 9/5027 |

(Continued)

FOREIGN PATENT DOCUMENTS

| | | | | |
|---|---|---|---|---|
| EP | 1439450 A2 * | 7/2004 | | G06Q 30/06 |
| JP | 2001222424 A * | 8/2001 | | G06F 21/10 |
| WO | WO-9842098 A1 * | 9/1998 | | G06F 21/10 |

OTHER PUBLICATIONS

* Snow. "Add License Purchase." (Aug. 24, 2021). Retrieved online Jun. 17, 2024. https://docs.snowsoftware.com/snow-license-manager/en/UUID-86b2ce58-cf0c-fb3a-6af9-2fb5f84c98b8.html (Year: 2021).*

(Continued)

*Primary Examiner* — James A Reagan
(74) *Attorney, Agent, or Firm* — Chernoff, Vilhauer, McClung & Stenzel, LLP

(57) ABSTRACT

The systems and method disclosed herein provide two paradigms for managing distribution of at least one license to one or more features defined in feature categories. A first embodiment is one that uses mixed single unit monthly credits, while a second embodiment uses separate fixed term credits.

16 Claims, 13 Drawing Sheets

(56) References Cited

U.S. PATENT DOCUMENTS

| | | | |
|---|---|---|---|
| 11,579,897 B2* | 2/2023 | Bartfai-Walcott | G06F 9/44505 |
| 2002/0107809 A1* | 8/2002 | Biddle | G06Q 30/06 705/59 |
| 2004/0044631 A1* | 3/2004 | Walker | G06F 21/10 705/59 |
| 2006/0155620 A1* | 7/2006 | Tsurubayashi | G06Q 30/06 705/35 |
| 2008/0052295 A1* | 2/2008 | Walker | G06F 21/10 |
| 2009/0044003 A1* | 2/2009 | Berthiaume | G06F 16/9554 713/100 |
| 2010/0049725 A1* | 2/2010 | Walker | G06F 21/10 707/E17.022 |
| 2010/0057674 A1* | 3/2010 | O'Donnell | G06Q 30/00 726/28 |
| 2013/0185173 A1* | 7/2013 | Zheng | G06Q 30/06 705/26.41 |
| 2013/0185197 A1* | 7/2013 | Brown | G06F 21/105 705/39 |
| 2013/0304642 A1* | 11/2013 | Campos | G06Q 20/3572 705/41 |
| 2014/0217166 A1* | 8/2014 | Berthiaume | G06F 16/17 235/375 |
| 2021/0011741 A1* | 1/2021 | Bartfai-Walcott | H04L 9/0866 |
| 2021/0012357 A1* | 1/2021 | Bartfai-Walcott | G06Q 50/184 |
| 2021/0012445 A1* | 1/2021 | Bartfai-Walcott | H04L 63/10 |
| 2021/0342836 A1* | 11/2021 | Cella | H04L 9/3239 |
| 2022/0092154 A1* | 3/2022 | Bartfai-Walcott | H04L 9/0861 |
| 2024/0095315 A1* | 3/2024 | Bartfai-Walcott | G06F 21/107 |

OTHER PUBLICATIONS

• Genesys. "PureConnect Licensing Technical Reference." (Jun. 22, 2020). Retrieved online Jun. 17, 2024. https://help.genesys.com/pureconnect/mergedprojects/wh_tr/desktop/pdfs/licensing_tr.pdf (Year: 2020).*

• Papercut. "PaperCut's Upgrade Policy." (Sep. 4, 2007). Retrieved online Jun. 17, 2024. https://www.papercut.com/kb/Main/Upgrade Policy/ (Year: 2007).*

* cited by examiner

METHOD AND APPARATUS FOR LICENSE CREDIT MANAGEMENT

CROSS-REFERENCE TO RELATED APPLICATIONS

The present application claims priority to U.S. Provisional App. No. 63/275,800 filed Nov. 4, 2021, the content of which is incorporated herein by reference in its entirety.

BACKGROUND

1. Field

The present disclosure relates to systems and methods for granting licenses to access data, and in particular to a system and method for managing the provision of feature licenses.

2. Description of the Related Art

Feature licensing has been increasingly used to control the internal functions of electronic devices after they are purchased by customers. A feature license for a specific device controls which internal functions of that device are enabled. Feature licensing allows flexibility for customers to acquire devices with less upfront cost and pay later for additional functions and capacity after the device is fielded and in use. When an internal function has a range of capacity, a feature license can also control the level of capacity at which the function should perform. For example, a video encoder may support high efficiency video coding (HEVC) and a maximum of 64 video streams. When the encoder has a feature license that does not enable HEVC and limits the number of video streams to 16, the encoder does not perform HEVC and can only encode up to 16 video streams. However, when the encoder has a different feature license that enables HEVC and limits the number of video streams to 48, the encoder will do HEVC encoding on up to 48 video streams. To make sure that a feature license can only be used by a specific device, the feature license is cryptographically bound to the unique identification of the device.

Since feature licensing permits consumers to add or delete functional features of their devices, a system is needed to accept such requests, generate modified or replacement licenses to enable the requested functionality, and to provide such replacement licenses to the respective devices. Such a system is described below.

SUMMARY

To address the requirements described above, this document discloses a system and method for managing distribution of at least one license to one or more features defined in feature categories. In one embodiment, the method comprises accepting a purchase request, the purchase request specifying a plurality of feature purchases, each feature purchase defining a number of purchase feature units and a purchase temporal term, and each feature belonging to one of the feature categories; pooling the feature purchases within each feature category to a number of purchase feature credits of a uniform credit temporal term; accepting a request for a license, the request specifying a license temporal term, and the request comprising, for each license request feature category: the feature category, and a number of license feature units; computing, for each license request feature category, a number of license feature credits consumed by the request for a license, according to a start date and the license temporal term; decrementing the number of license feature credits in each feature category according to the number of license feature credits consumed in the feature category; and providing the requested license if a sufficient number of license feature credits are available in each feature category.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
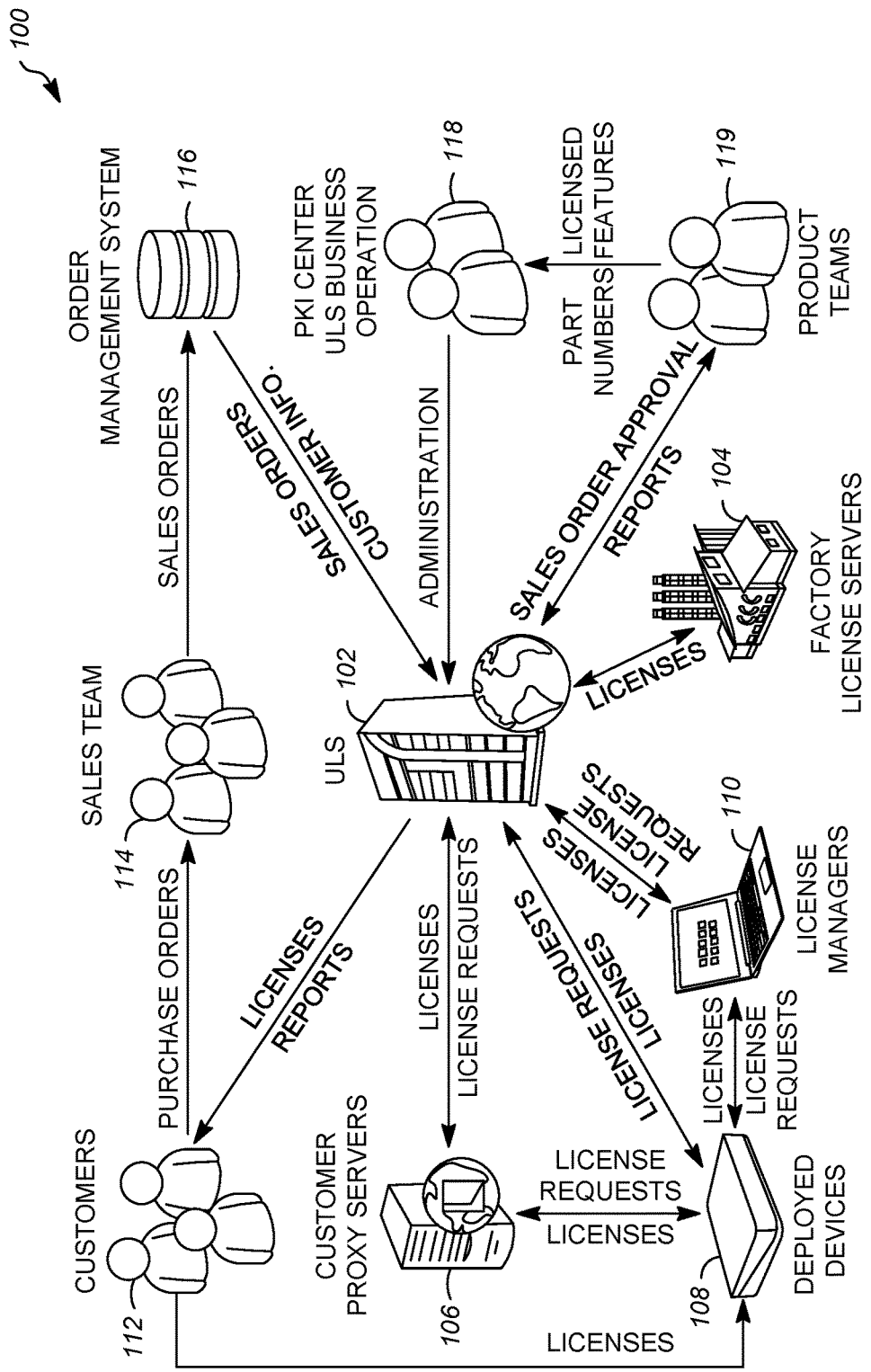
FIG. 1 is a diagram illustrating one embodiment of a licensing system.

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The systems and method disclosed herein provide two paradigms for managing distribution of at least one license to one or more features defined in feature categories. A first paradigm is one that uses mixed single unit monthly credits. Sales of parts for a feature/capacity with different terms are broken into monthly credits and mixed in the same credit pool for the feature/capacity. Upgrades and extensions cost monthly credits. Extension by any number of months can be requested and provided. Two embodiments are envisioned . . . one in which downgrades allowed but no credit refund is provided for such downgrades, and another in which credits are refunded when downgrades are provided.

A second paradigm is one that uses separate single unit fixed term credits. Sales of parts for a feature/capacity with different terms turned into single unit fixed term credits kept in separate credit pools for the feature/capacity. Upgrades obtained outside the grace period cost full-term credits, while upgrades obtained inside grace period cost no credit. Extensions cost credits of the chosen term, and extensions are available only by terms offered through the parts. As before, downgrades are allowed, with one embodiment not permitting credit refunds, while the another embodiment permitting credit refunds.

Part Number Definition

In both cases, product line managers (PLMs) define part numbers (PNs) with a specific term. For the mixed single unit monthly credit case, a PLM may define the following part numbers:
- PN1: License to a DRM system (e.g. SIMULCRYPT) for 6 months.
- PN2: License to a DRM system for 9 months.
- PN3: 1 high definition (HD) channel for 12 months.
- PN4: 5 HD channels for 24 months.

As shown above, different terms may be offered for the same product feature or capacity, and different terms can be offered across different product features/capacities.

For the separate single unit fixed term credit case, a PLM may define the following part numbers:
- PN1: License to a DRM system (e.g. SIMULCRYPT) for 6 months.
- PN2: License to a DRM system for 9 months.
- PN3: 1 high definition (HD) channel for 6 months.
- PN4: 5 HD channels for 9 months.

As shown above, different temporal terms may be offered for the same product feature or capacity, but unlike the mixed single unit monthly credit case, the temporal terms need to be aligned across different features (e.g. one cannot define PN4 to be other than either 6 or 9 months)

Subscription Rules

In both cases, PLMs define license subscription rules at the product level. For example, subscription rules may be defined to only have an initial term of 12 months and to be extended only at a choice of either 6 months or 9 months.

Mixed Single Unit Monthly Credit: In the mixed single unit monthly credit paradigm, the Universal Licensing System (ULS) server 102 (described below) converts sales orders into single unit monthly credits, subscription rules can be defined such that the allowed initial terms and intention terms do not have to be one of the terms on the part numbers, for example: Order A for 4 PN1 (DRM for 6 months) is converted to 4×6=24 credits of 1 month of DRM; Order B for 1 PN2 (DRM for 9 months) is converted to 1×9=9 credits of 1 month of DRM; Order C for 5 PN3 (1 HD channel for 12 months) is converted to 5×1×12=60 credits of 1 month of 1 HD channel; and Order D for 2 PN4 (5 HD channels for 24 mo.) is converted to 2×5×24=240 credits of 1 month of 1 HD channel. Then credits from orders for different subscription PNs of the same feature/capacity are mixed into the same credit pool. For example, orders A and B above add 24+9=33 credits to the credit pool for 1 month of DRM, while orders C and D add 60+240=300 credits to the credit pool for 1 month of 1 HD channel.

Separate Single Unit Fixed Term Credit: In the separate single unit fixed term credit paradigm, the PLMs decide subscription rules at a product level. For example, the subscription rules can be such that subscriptions can only have an initial term of 9 months and be extended for either 6 months or 9 months, or that a subscription can only have an initial term of 6 months or 9 months and be extended for 6 months. Unlike the first paradigm, the subscription rules of this paradigm require that the allowed initial terms and extension terms must be one of the terms of the PNs. Also, PLMs specify a grace period (e.g. 15 days before the expiration of the feature license) such that upgrades added within the grace period do not consume credits. This allows for a smooth transition from one subscription period to the next. This paradigm also allows conversion of credits from credit pools of the same feature/capacity but with different terms allowed. This is allowed per the PLM's discretion and carried out by ULS business operations through ad-hoc credit adjustments according to instructions from the PLM. In this paradigm, the ULS converts sales orders into the separate single unit fixed term credits.

For example, in this paradigm, Order A for 4 PN1 (DRM for 6 months) is converted to 4 credits of 6 months of DRM; Order B for 1 PN2 (DRM for 9 months) is converted to 1 credit of 9 months of DRM; Order C for 5 PN3 (1 HD channel for 6 months) is converted to 5 credits of 6 month of 1 HD channel; and Order D for 2 PN4 (5 HD channels for 9 months) is converted to 2×5=10 credits of 9 months of 1 HD channel. Then credits from orders for different subscription terms of the same feature are kept separate in different credit pools. For example, order A adds 4 credits to the 6 month pool of DRM credits, while order B above adds 1 credit to the 9 month credit pool for DRM, while orders C adds 5 credits to the 6 month pool of HD channel feature credits and order D adds 10 credits to the 9 month credit pool of 1 HD channel.

Conversion of credits from credit pools of the same feature/capacity but with different terms are allowed according to the PLM's discretion. This is carried out by ULS business operations through ad-hoc credit adjustments according to instructions from the appropriate PLM. No dynamic conversion or cross credits with different temporal terms (e.g. 6 months and 9 months) are allowed at the time of license generation.

Licensing System Architecture

FIG. 1 is a diagram illustrating an exemplary licensing system 100. The licensing system 100 comprises a ULS server 102 that is used to receive license requests, provide licenses in response to the requests, accept license sales orders and customer information, as well as generate reports and provide an interface for ULS server 102 administration.

Product teams 119 define licensable features as well as feature purchase requirement paradigms. Feature purchase requirements may define, for example, what feature licenses are offered to which devices, when such feature licenses may be purchased and when the feature license may be effective, in what numbers such feature licenses must be purchased (e.g. a minimum or maximum number of licenses for a particular feature such as the ability to receive and reproduce HD channels), minimum or maximum term of the feature license, and the contents of feature license packages (e.g. which feature licenses are packaged with other feature licenses and issued a part number). Those licensed features and the part numbers referring to combinations of those licensed features are provided to a ULS business operations center 118, which administrates the ULS server 102. This information, including licensed features and part numbers are provided to a ULS business operations center 118, which administers the ULS server 102.

A sales team 114 interfaces with customers 112 to obtain purchase orders. These purchase orders are evidenced by sales orders that are provided to an order management system 116, which provides the sales orders and customer 112 information to the ULS server 102. Licenses can then be provided to factory license servers 104, which install or provide the licenses to the target devices at the factory where the devices are produced. Such licenses may be in response to requests from the factory license servers 104 or pushed to the factory license servers 104. Licenses can also be provided to deployed devices 108. Such licenses may be obtained directly from the ULS server 102 in response to license requests, or via license managers 110, which receive license requests, forward such requests to the ULS server 102, and thereafter forward received licenses to the deployed devices. Customer proxy servers 106 can also act as intermediaries between the deployed devices 108 and the ULS server 102, accepting license requests, forwarding such requests to the ULS server 102, and accepting licenses from the ULS server 102 and forwarding such licenses to the deployed device 108. Such provision of licenses may be approved by the customers 112 before such licenses are provided.

The following nomenclature is noted:

Feature Entitlement: The right to use a product feature up to a certain cap.

License File (license): A file that contains a customer's feature entitlements for a specific product unit.

License Request: A file that contains the feature entitlements requested for a specific product unit.

Licensed Feature (feature): A product feature enabled/capped by a license.

License Part (part): A part with a unique part number representing a set of feature entitlements that can be sold to customers.

License Credit (credit): A unit of feature entitlement granted to a customer through sales or gratuitous grant.

Customer site (site): A customer entity that has the sole ownership of certain license credits.

Credit Pool: A collection of license credits for a specific feature and owned by a customer site.

Figure 2:
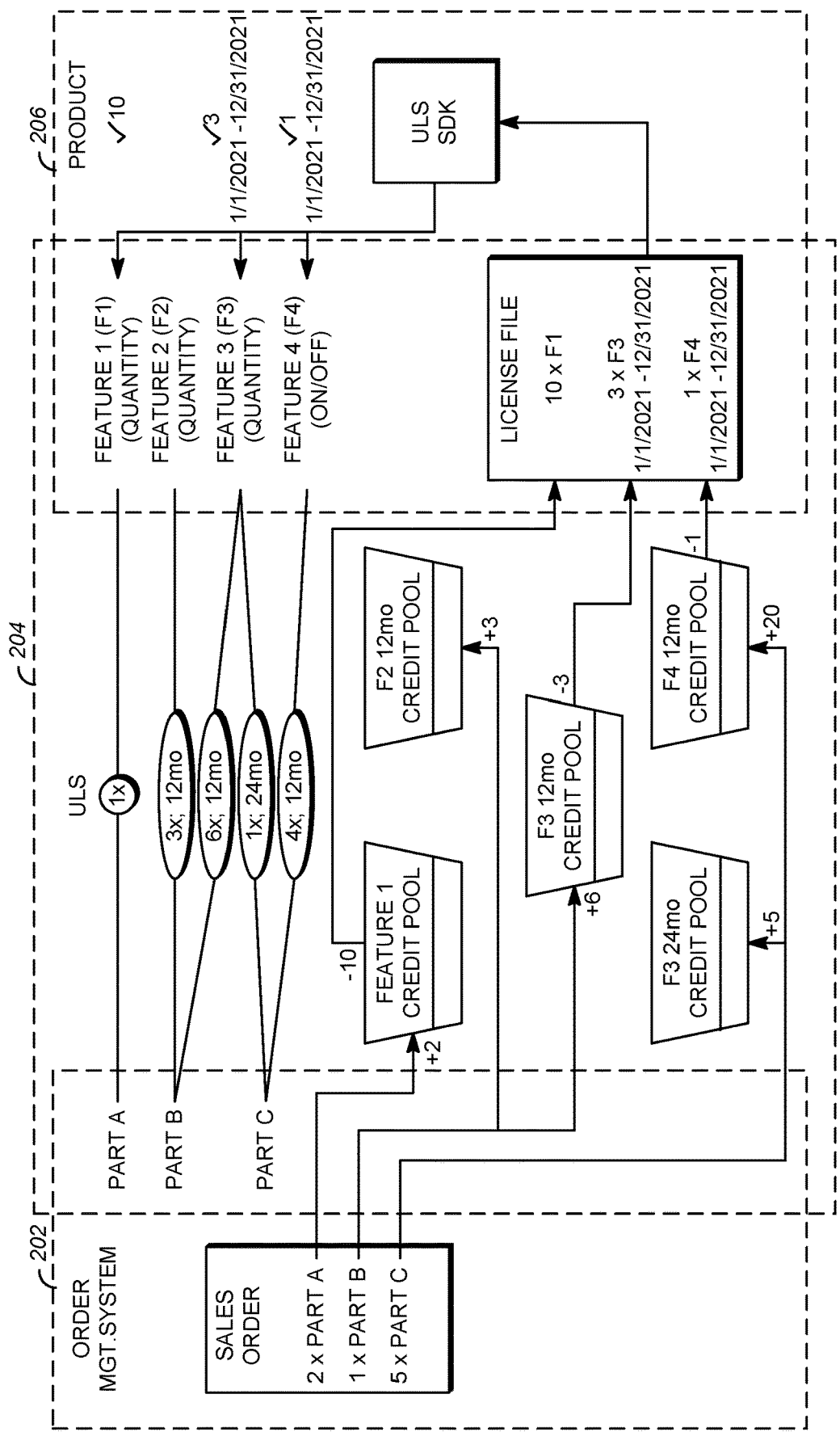
FIG. 2 is a diagram illustrating relationships between part numbers, features, feature credits and feature credit pools.

FIG. 2 is a diagram illustrating relationships between part numbers, features, feature credits and feature credit pools. In the illustrated embodiment, "Part A" is associated with 1 feature credit for feature 1. "Part B" is associated with 3 12 month credits of feature 2 and 6 12 month credits of feature 3 (so a single order for part B provides 3 12 month license credits for feature 2 and 6 12 month license credits for feature 3). Feature credits are aggregated into credit pools. In the illustrated example, a sales order includes an order for 2 of Part A, 1 of Part B, and 5 of Part C. An order for 2 of Part A adds two feature credits for feature 1. The exemplary sales order also includes an order for one of Part B, which adds 3 (1×3) 12 month feature credits to the feature credit pool for feature 2 and 6 (1×6) 12 month credits to the feature credit pool for feature 3. Similarly, the order includes an order for 5 of part C, which adds 5 (1×5) 24 month feature credits to the feature credit pool for feature 3, and 20 (4×5) 12 month feature credits to the feature credit pool for feature 4. If a client or device requests a license file using a ULS software development kit that has 10 license credits for feature 1, 3 12 month license credits for feature 3 and 1 12 month license credits for feature 4, the appropriate number of license credits are debited from each credit pool as shown.

Figure 3:
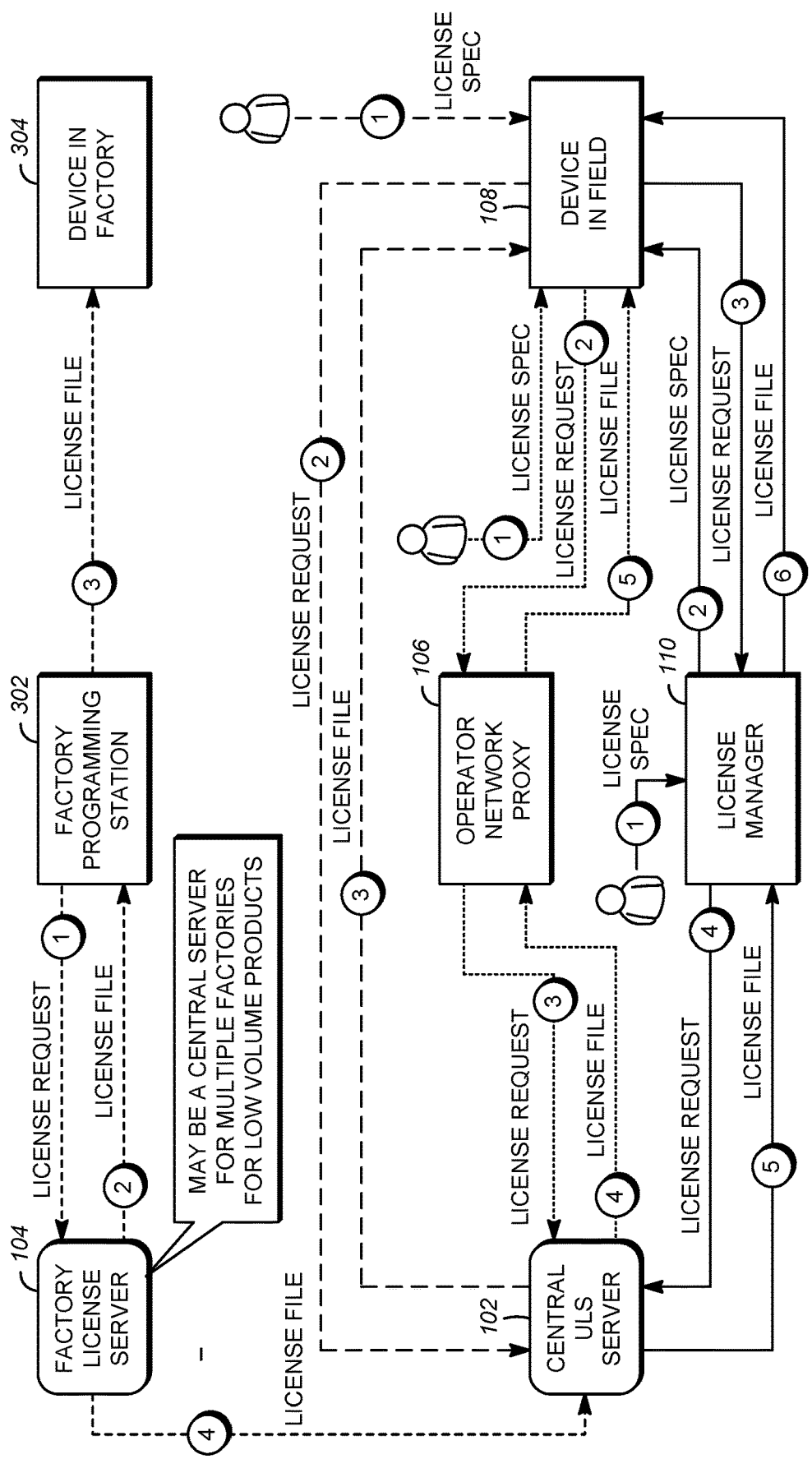
FIG. 3 is a diagram illustrating representative embodiments of protocols for requesting and obtaining a license file.

FIG. 3 is a diagram illustrating representative embodiments of protocols for requesting and obtaining a license file. A first embodiment concerns the provision of licenses to devices 304 while at the factory. In step (1), a factory programming station 302 transmits a license request to the factory license server 104. In step (2) the factory license server 104 determines whether the requisite number of feature license credits are available for the requested features. If the number of feature license credits is adequate to satisfy the request, the factory license server 104 decrements the appropriate feature license credit pools the appropriate number of credits, and transmits a license file having the appropriate feature licenses to the factory programming station 302, as shown in step (2). The factory programming station 302 then provides the license file to the device at the factory, as shown in step (3). The ULS server 102 is also provided the license file, as shown in step (4). This is for possible future license modification and provision after the devices are transferred to the field. Once the devices are transferred to the field, they can only connect to ULS for any license modification and provision.

Other embodiments concern the provision of licenses to fielded devices 108. Such license requests can be made by the device 108 itself directly to the ULS server 102, or may be made via an operator network proxy such as the customer proxy servers 106 or a license manager 110 (useful in instance where the fielded device does not have direct access to the ULS). In the first case, a license specification (license requirements) is provided to the device 108 in step (1), and based on this license specification, the device 108 generates a license request and transmits that request to the ULS server 102. The ULS server 102 determines if there are adequate feature license credits to provide the requested license, and if so, decrements the credit pool of the associated feature license the appropriate amount, and transmits the license file to the device 108, as shown in step 3. In a second case, the license specification (requirements) are provided to the fielded device 108, and the license request is provided to and received from the ULS server 102 via an operator network proxy or customer proxy service 106. In the third illustrated case, the license specification (requirements) are provided to the license manager 110, and the license manager 110 provides the license specification to the fielded device 108. The fielded device generates a license request based on the license specification. The license request is provided to the ULS server 102 and the ULS server provides the license file to the fielded device 108 via the license manager 110.

Figure 4:
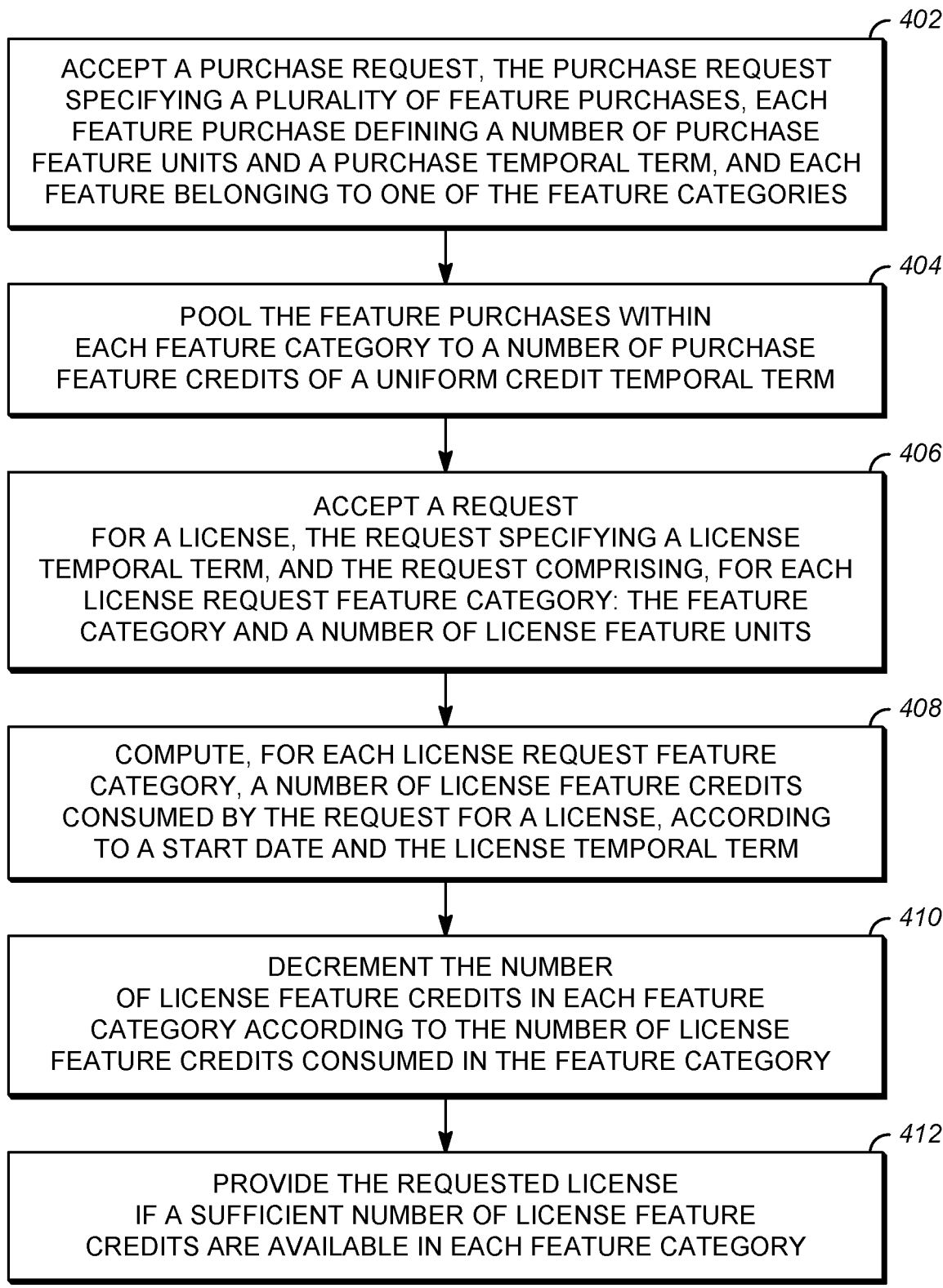
FIG. 4 is a diagram illustrating exemplary operations that can be used to manage distribution of at least one license to one or more features defined in feature categories, in particular, the generation of an initial license for either the mixed single unit monthly credit or separate single unit fixed term credit paradigms.

FIG. 4 is a diagram illustrating exemplary operations that can be used to manage distribution of at least one license to one or more features defined in feature categories, in particular, the generation of an initial license for either the mixed single unit monthly credit or separate single unit fixed term credit paradigms. In the discussion below, the following conventions are noted:

Feature purchase: A purchase of a license to a particular feature. Such features include, for example, a DRM, HD channels, or SD channels.

Feature purchase unit(s): The number of licenses that are purchased for a particular feature. For example, one might purchase 1 unit of DRM feature license, 10 units of a HD channel feature license, and 5 units of an SD channel feature license.

Feature license temporal term: The term of each feature purchase unit. For example, one unit of the DRM feature license may have a license temporal term of 12 months, each of the 10 units of the HD channel feature license may have a temporal term of 6 months, and each of the 5 units of the SD channel feature license may have a temporal term of 6 months.

Purchase category: The category to which each feature belongs. For example, DRM is one purchase category, HD channel is another purchase category, and SD channel is still another purchase category.

Purchase feature credits: The product of the feature purchase unit(s) and the feature license temporal term in a uniform temporal term of units (e.g. 1 month). For example, using the feature purchase unit and license temporal term examples above, the result is 1×12 purchase feature credits of DRM, 10×6 purchase feature units of HD, and 5×6 purchase feature units of SD.

A start date is specified within a certain limit (e.g. 3 months from the date the initial license is generated). A term conforming to the subscription rules of the mixed single unit monthly credit or separate single unit fixed term credit paradigm is selected. Feature licenses/capacities are specified, and the expiration date of the license is calculated based on the specified start term and end term.

Initial License

In block 402, a purchase request is accepted. A term conforming to the subscription rules of the mixed single unit monthly credit or separate single unit fixed term credit paradigm is selected. The purchase request specifies a plurality of feature purchases, each feature purchase defining a number of purchase feature units and a purchase feature temporal term. Further, each feature belongs to one of a plurality of feature categories.

In block 404, the feature purchases are pooled within each feature category to a number of purchase feature credits of a uniform credit temporal term. For example, feature purchases may include the following:

Feature Purchase: DRM
Feature Purchase Units: 3
Feature license temporal term: 12 months
Feature Purchase: HD channel
Feature Purchase Units: 10
Feature license temporal term: 12 months In this case, the feature purchases are pooled as follows:
3×12 credits of 1 month of DRM=36 credits of DRM
10×12 credits of 1 month of HD channels=120 credits of HD channels In block 406, a request for an initial license is accepted. The request specifies a license temporal term and a license start date, and the request comprises, for each license request feature category: (1) the feature category and (2) a number of license feature units. For example, in the foregoing example, a request for an initial license may specify a license for 1 DRM feature and 10 HD channels that begins on Jan. 1, 2018, with a license temporal term of 12 months.

Returning to FIG. 4, block 408 computes, for each license request feature category, a number of license feature credits consumed by the request for a license according to the start date and the license temporal term. In the foregoing example, the request consumes 1×12 credits of 1 month of DRM, and 10×12 credits of 1 month of HD channel access. Block 410 decrements the number of license feature credits in each feature category according to the number of license feature credits consumed in the feature category by the license request. If a sufficient number of license feature credits are available in each feature category, the requested license is provided, as shown in block 412, and the decrementing of the number of feature credits performed in block 410 are committed. In the foregoing example, this results in a new license with 1×12 credits of 1 month of DRM, and 10×12 credits of 1 month of HD channel access. A total of 2×12 credits of 1 month of DRM remain in that feature credit category.

In one embodiment, the requested license expires after the feature license temporal term for all of the feature categories. In the foregoing example, this is 12 months. In still another embodiment, the purchase temporal term of each feature purchase differs from at least one of the other temporal terms of a same feature purchase. For example, two part numbers can be identified for the same feature, with one part number being for a different feature license temporal term. For example, PN1 may be for DRM for 6 months, while PN2 may be for DRM for 9 months. Similarly, PN3 may be defined for 1 HD channel for 12 months, while PN4 may be defined for 5 HD channels for 24 months. If 4 PN1s, 1 PN2, 5 PN3s and 2 PN4s are ordered, the result is 4×6=24 credits of 1 month of DRM, 1×9=9 credits of 1 months of DRM, 5×1×12=60 credits of 1 month of 1 HD channel, and 2×5×24=240 credits of 1 months of 1 HD channel. Pooling these feature credits results in 24+9=33 credits in a credit pool for 1 month of DRM, and 60+240=300 credits to another credit pool for 1 months of 1 HD channel. Note also that the purchase temporal term of a feature purchase of a first feature may differ from the purchase temporal term of another feature purchase of a second feature. In other words, an ordering paradigm may be established in which DRM feature licenses having a 9 month temporal term does not require that HD feature licenses must also be of a 9 month temporal term.

The generation of the initial license in the Separate Fixed Term Credit case can also be implemented as described by the operations illustrated in FIG. 4. However, in the case of Separate Fixed Term Credits, the purchase temporal term is one of a limited set of purchase temporal terms (e.g. a set of purchase temporal terms for each feature categories must be defined by different PNs, and once defined, feature credits must be chosen from this set). Further, the purchase temporal term of a feature purchase of any of the feature categories must be an offered term of another feature purchase of another feature if both features are to be in the same request for a license. For example, if a request for a license consists of both DRM feature and HD channel feature; both must have the same term (such as 6 months). Therefore, a purchase temporal term of 6 months must be offered for a DRM feature license; and a purchase temporal term for an HD channel feature license must include a term of 6 months.

Importantly, feature purchases are no longer pooled or aggregated simply according to feature category for a fixed term (e.g. with 6 month term HD feature licenses aggregated with 9 month term HD feature licenses to a number of 1 month units), but rather according to a combination of the purchase temporal term and the feature category. For example, in this case, 9 month term HD feature licenses can only be pooled with other 9 month term HD feature licenses and 6 month term HD feature licenses can only be aggregated with other 6 month term HD feature licenses. In both cases, the temporal term of each of the feature credits of the pool is uniform (e.g. the temporal term of the feature credits in the 6 month term HD feature licenses are all 6 months long and the temporal term of the feature credits in the 9 month term HD feature licenses are all 9 months long).

Also in the Separate Single Unit Fixed Term Credit case, the number of license feature credits consumed by request for licenses is computed for each feature category and purchase temporal term combination (rather than simply the category), and the number of license feature credits are decremented in each feature category and purchase temporal term combination according to the number of license feature credits consumed in the feature category and purchase temporal term combination.

For example, to generate an initial license in the Separate Fixed Term Credits case, a start date is specified, which may be within a certain temporal limit (e.g. 3 months) from the current date (the date the user begins specifying the requirement for the initial license). A term conforming to the subscription rules is specified. For example, if the PNs for the feature licenses are available only in temporal terms of 6 or 9 months the term of the license must be either 6 months or 9 months. Next, desired feature license capacities are specified (e.g. 2 DRM feature licenses with a term of 9 months). The expiration date of the resulting initial license is then calculated based on the start date and the term. Once completed, the initial license may, for example, have the following characteristics: a start date of Jan. 1, 2018, a term of 9 months, one DRM feature license (for 9 months) and 5 HD channel feature licenses (also for 9 months), This license consumes 1 credit of 9 months of a DRM feature license, and 5 credits of 9 months of 1 HD channel feature license.

Mixed Single Unit Monthly Credit Extension, Upgrade, and Downgrade Use Cases

Provision is made for generating new licenses after a previously granted license expires, upgrading licenses without extending the term of initially granted licenses, extending the term of the current licenses, upgrading and extending the term of the licenses, downgrading licenses without extending their term, downgrading and extending the term of the licenses, downgrading licenses with or without providing credit refunds. If a new license is needed after the previously issued license expires, a new license is simply generated as described above.

Figure 5:
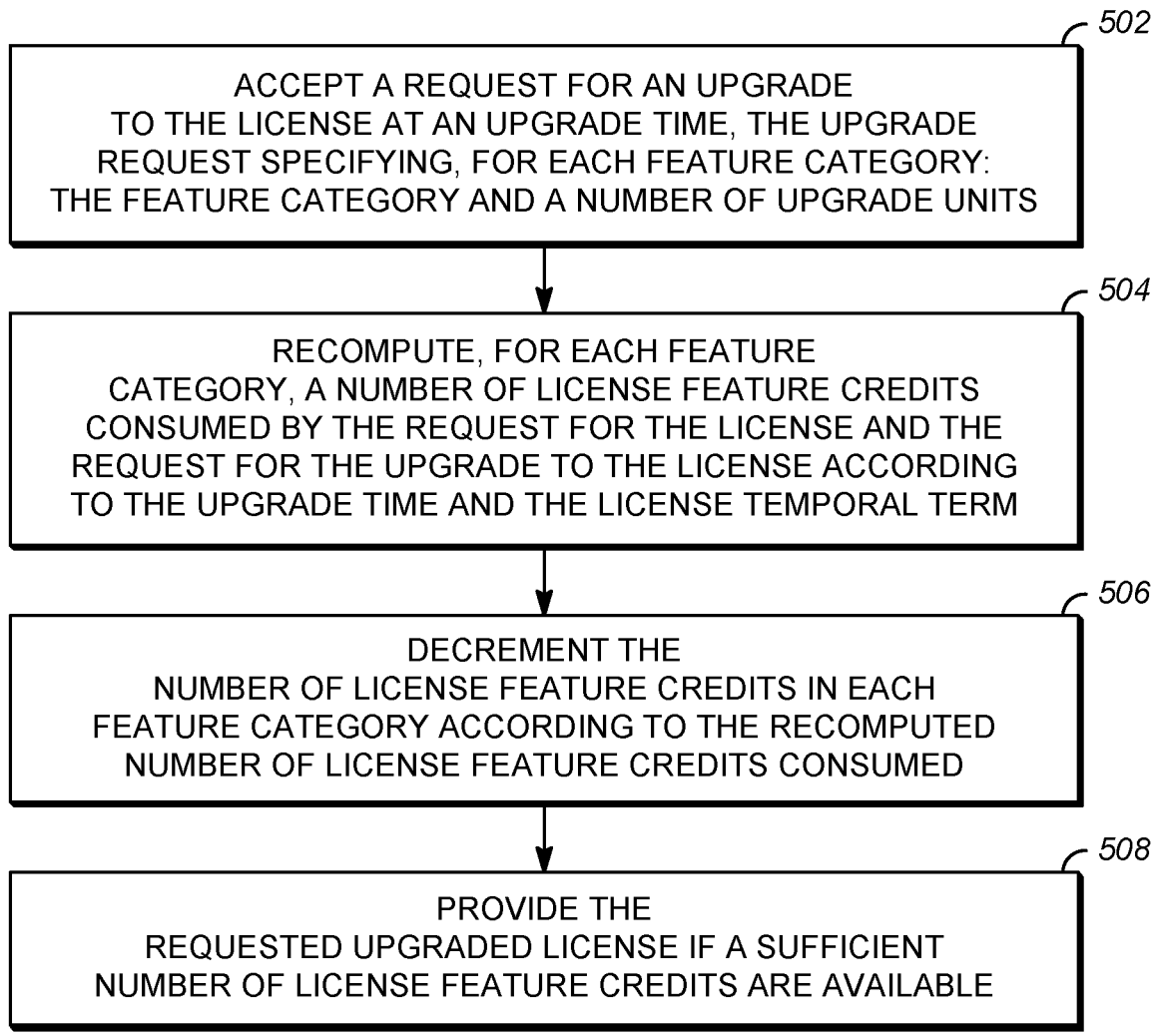
FIG. 5 is a diagram depicting, for the mixed single unit monthly credit use cases, exemplary operations for upgrading a license without extending the term of the license outside of a grace period.

FIG. 5 is a diagram depicting, for the mixed single unit monthly credit use cases, exemplary operations for upgrading a license without extending the term of the license. In block 502, a request for an upgrade to the license is accepted at an upgrade time. The upgrade request specifies, for each feature category and purchase term combination: (1) the feature category and (2) the number of upgrade units.

Block 504 recomputes, for each feature category, a number of license feature credits consumed by the request for the license and the request for the upgrade to the license according to the upgrade time and the license temporal term. If there are insufficient license feature credits in any of the relevant feature categories to satisfy the request, the requestor is prompted to purchase additional license feature credits.

Block 506 decrements the number of license feature credits in each feature category according to the recomputed number of license feature credits consumed. Finally, block 508 provides the requested upgraded license if a sufficient number of license feature credits are available.

For example, presume that in the earlier example, one DRM feature license for 12 months as well as 10 HD channels for 12 months was purchased, and an existing license requested and provided for 1 DRM feature license for 12 months and 10 HD channel feature licenses for 12 months, and that the granted license began on Jan. 1, 2018, and is scheduled to expire on Dec. 31, 2018. Further presume that on Jun. 5, 2018 (about 7 months before the initially granted license is set to expire), there is a desire to upgrade the license to add 5 HD channels. A request to upgrade the license at the upgrade time to add the 5 additional HD channels is accepted, and in each feature category, the number of license feature credits consumed by the initial license request and the upgrade request are computed according to the upgrade time and the license temporal term. This consumes 5×7=35 HD feature credits of one month of HD channel reception capability. Since 120 credits were initially purchased and an additional 5×7=35 credits of 1 months of HD channel are required, the requestor is required to purchase an additional 35 credits of 1 month of HD channel feature license credits to complete the upgrade of the license.

Figure 6:
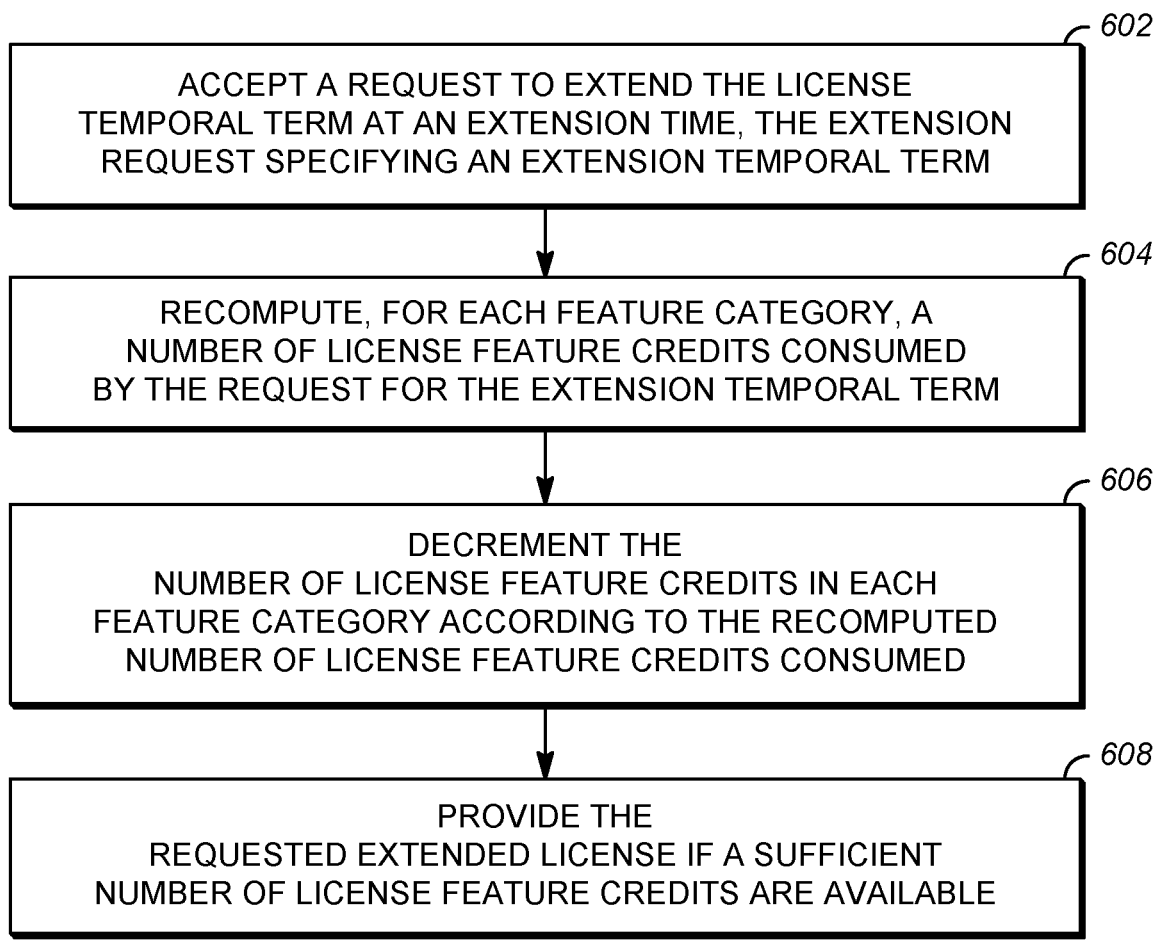
FIG. 6 is a diagram depicting, for the mixed single unit monthly credit use cases, exemplary operations for extending the subscriptions in a current license.

FIG. 6 is a diagram depicting, for the mixed single unit monthly credit use cases, exemplary operations for extending the subscriptions in a current license. In block 602 a request to extend the license temporal term is accepted at an extension time, the extension request specifying an extension temporal term. In block 604, the number of feature license credits consumed by the request for the extended temporal term is recomputed for each feature category, and compared to a number of current license feature credits for each relevant feature category. If the number of current license feature credits in any feature category are insufficient, additional license feature credits in the appropriate feature category must be purchased. Block 606 decrements the number of license feature credits in each feature category according to the recomputed number of license feature credits consume. Block 608 provides the requested extended license if a sufficient number of license feature credits are available.

For example, in the above case, a license was initially granted for DRM and 10 HD channels starting on Jan. 1, 2018, and expiring on Dec. 31, 2108. At any time before Dec. 31, 2018, (for example, Jul. 15, 2018) it may be desired to extend the current license so that it expires 9 additional months later (e.g. Sep. 30, 2019). This will consume an additional 1×9=9 credits of 1 months of the DRM feature, and 10×9=90 additional credits of 1 HD channel. If there are insufficient license DRM credits and license feature HD channel credits to satisfy this request, additional credits must be purchased according to the specified paradigm.

Figure 7:
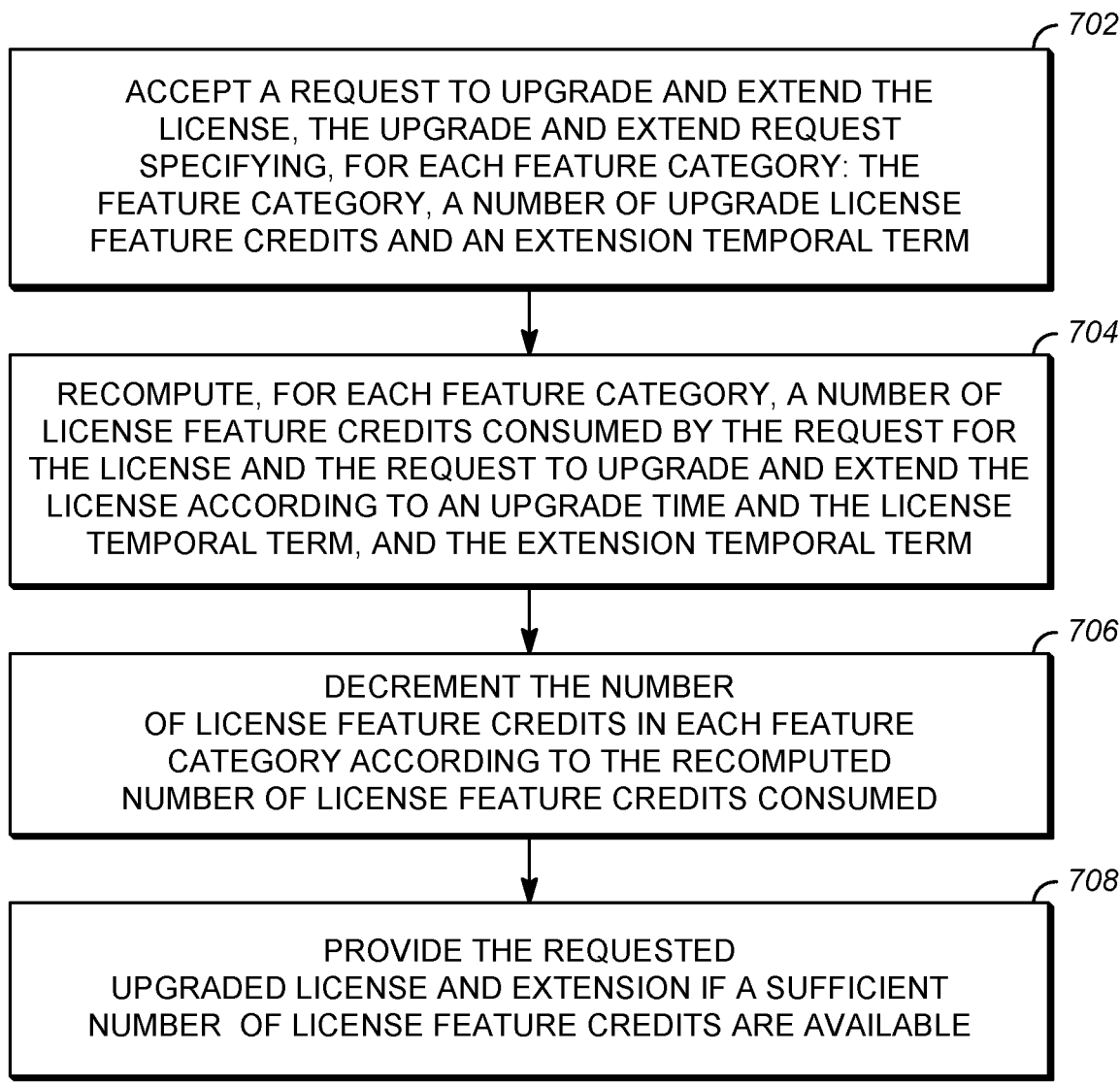
FIG. 7 is a diagram depicting, for the mixed single unit monthly credit use cases, exemplary operations for upgrade the initial license and extending the upgraded subscriptions in the license.

FIG. 7 is a diagram depicting, for the mixed single unit monthly credit use cases, exemplary operations for upgrade the initial license and extending the upgraded subscriptions in the license. In block 702, a request is accepted to upgrade and extend the license. The request specifies, for each feature category, at least: (1) the feature category, (2) a number of upgrade license feature units or credits and (3) an extension temporal term. For example, in the previous example of an existing initial license to DRM and 10 HD channels from Jan. 1, 2018 to Dec. 31, 2018, we consider a request to add 5 HD channels and extend the license for 6 months.

Block 704 recomputes, for each feature category, a number of license feature credits consumed by the request for the license and the request to upgrade and extend the license according to the number of upgrade license feature credits in each feature category (in the foregoing example, 5 HD channels) upgrade time (in the foregoing example, Sep. 5, 2018), the license temporal term and the extension temporal term (in the foregoing example, 6 months). Block 706 decrements the number of license feature credits in each feature category according to the recomputed number of license feature credits consumed. If a sufficient number of license feature credits are available in each category, the decrementing of the number of license feature credits in each feature category is committed, and the upgraded and extended license is provided, as shown in block 708. If an insufficient number of license feature credits are available, the requestor is given an opportunity to purchase additional license feature credits in the associated feature categories. Turning to the foregoing example, adding 5 HD channels consumes 4×20 credits of 1 months of the HD channel feature, and extending the combined license for 6 months consumes 1×6=6 credits of the DRM feature as well as (10+5)×6=90 credits of 1 month of the HD feature. The new license provides the DRM feature license and 15 HD channel feature licenses and starts on Sep. 5, 2018, and expires 6 months after the initial expiry date or Jun. 30, 2019.

Figure 8:
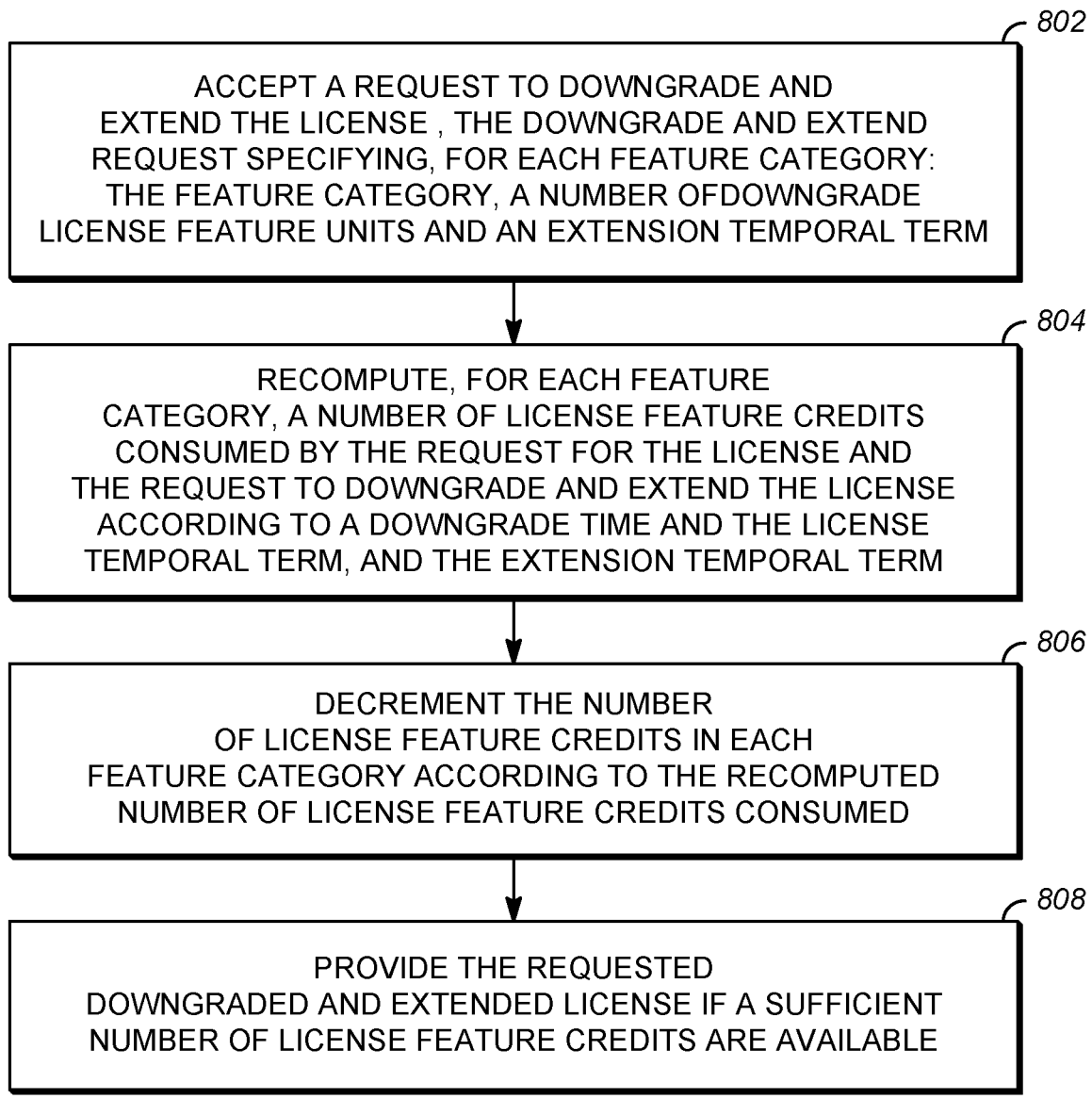
FIG. 8 is a diagram depicting, for the mixed single unit monthly credit use cases, exemplary operations to downgrade and extend the initial license.

FIG. 8 is a diagram depicting, for the mixed single unit monthly credit use cases, exemplary operations to downgrade and extend the initial license. In block 802, a request is accepted to downgrade and extend the initial license. The downgrade and extend request specifies, for each feature category, the feature category, a number of downgrade license feature units, and an extension temporal term. For example, in the previous example of an existing initial license to DRM and 10 HD channels from Jan. 1, 2019 to Dec. 31, 2018, we consider a request to remove the DRM feature license and the feature license for 3 HD channels, while extending the resulting license for 6 months. In one embodiment, no credit refund is provided, in which case removing the DRM feature license does not result in a DRM feature credits being added to a DRM feature credit pool.

Block 804 recomputes, for each feature category a number of license feature credits consumed by the request for the license and the request to downgrade and extend the license according to the downgrade time, the license temporal term, and the extension temporal term. As described above, this embodiment may or may not provide for refund of feature credits. If refunds are provided, the number of downgrade feature credits in each feature category is also included in the recomputation. Block 806 decrements the number of license feature credits in each feature category according to the recomputed number of license feature credits consumed for the extension. If a sufficient number of license feature credits are available in each category, the decrementing of the number of license feature credits in each feature category is committed, and the upgraded and extended license is provided, as shown in block 808. If an insufficient number of license feature credits are available, the requestor may be given an opportunity to purchase additional license feature credits in the associated feature categories. Turning to the foregoing example, removing the DRM feature license and extending the HD feature licenses for 6 months consumes zero credits of DRM feature license credits and (10−3)×6=42 credits of one month of HD channel feature license credits. The new license provides no DRM feature license, but 10 HD channel feature licenses that starts on the downgrade time (in this case, Dec. 20, 2018) and ends 6 months after Dec. 31, 2018, or Jun. 30, 2019.

As noted above, the foregoing downgrade use case does not permit refunds of unused feature license credits. In another embodiment, a credit refund option may be provided in downgrade use cases, with unused feature license credit term credited back to the feature license credits. In this case, a license confirmation file that verifies the downgraded license installation may be generated on the licensed device. In one embodiment the final feature license credits refunded are based on the information (e.g. the license installation date) provided in the license confirmation file. For example, consider the case above where an initial license of 1 DRM feature license and 10 HD channel feature licenses is provided for a 12 month period beginning on Jan. 1, 2018, and ending on Dec. 31, 2018. At any time before the expiration of the license (e.g. for example, on Sep. 5, 2018), a request is made to remove the DRM feature license and 3 HD feature licenses. In this case, 1×3 DRM feature license credits and 10×3=30 HD channel feature license credits are refunded (added to the credit pool) if the downgraded license is applied before Sep. 30, 2018. The result is a new license having 7 HD channel feature licenses that begins on Sep. 5, 2018, and expires on Dec. 31, 2018.

In all of the foregoing mixed single unit monthly credit cases, upgrading and downgrading can happen to different feature licenses at the same time, with or without extension.

Separate Fixed Term Credit Extension, Upgrade, and Downgrade Use Cases

Provision is made for generating new licenses after a previously granted license expires, upgrading licenses without extending the initially granted license, extending current licenses, upgrading and extending licenses, downgrading licenses without extending them, downgrading and extending licenses, downgrading licenses with or without providing credit refunds. If a new license is needed after the previously issued license expires, a new license is simply generated as described above.

Figure 9:
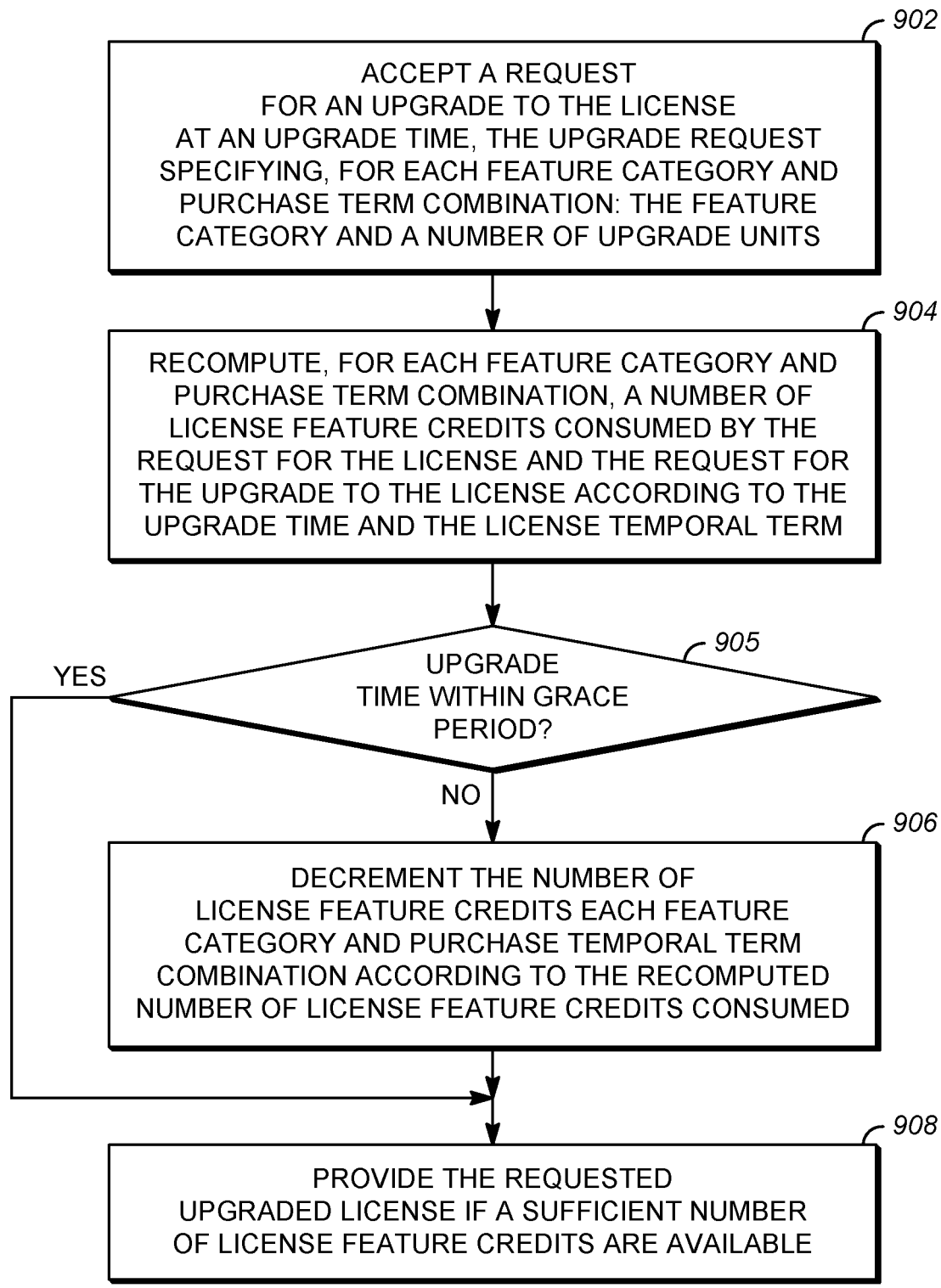
FIG. 9 is a diagram depicting, for the separate single unit fixed term credit case, exemplary operations for upgrading a license without extending the term of the license.

FIG. 9 is a diagram depicting, for the separate single unit fixed term credit case, exemplary operations for upgrading a license without extending the term of the license for the Separate Fixed Term Credit case. In block 902, a request for an upgrade to the license is accepted at an upgrade time. The upgrade request specifies, for each feature category and purchase term combination: (1) the feature category and purchase term combination and (2) the number of upgrade units.

Block 904 recomputes, for each feature category and purchase term combination, a number of license feature credits consumed by the request for the license and the request for the upgrade to the license according to the upgrade time and the license temporal term. If there are insufficient license feature credits in any of the relevant feature categories to satisfy the request, the requestor is prompted to purchase additional license feature credits.

Block 905 determines if the upgrade time is within a grace period. If the upgrade time is within the grace period, processing is routed to block 908, which provides the requested upgraded license if a sufficient number of license feature credits are available. If the upgrade time is not within the grace period, processing is routed to block 906, which decrements the number of license feature credits in each feature category and purchase temporal term combination according to the recomputed number of license feature credits consumed. Finally, block 908 provides the requested upgraded license if a sufficient number of license feature credits are available. If a sufficient number of license feature credits are not available, the requestor is given the option of purchasing additional license feature credits. Note that in this embodiment, the customer is charged for full-term credits when a sufficient temporal distance into the initial license term, but outside of a grace period.

For example, presume that in the earlier example, one DRM feature license for 9 months as well as 10 HD channels for 9 months was purchased, and an existing license requested and provided for 1 DRM feature license for 9 months and 10 HD channel feature licenses for 9 months, and that the granted license began on Jan. 1, 2018, and is scheduled to expire on Sep. 30, 2018. Further presume that at a time outside of a grace period of, for example, 15 days, a request is received to add 5 HD channels. If the request is received on Apr. 20, 2018 (outside of the grace period), this request will consume 5 credits of one 9 month duration HD channel feature license. The new license will include one 9 month DRM feature license, and 15 HD channel feature licenses, the original 10 HD licenses beginning on Jan. 1, 2018, and expiring on Sep. 30, 2018, and the added 5 HD licenses beginning on Apr. 20, 2018, and also expiring on Sep. 30, 2018 (instead of extending 9 months from Apr. 20, 2018. Note that the customer is charged for full term (e.g. 9 months) of HD feature credit for the additional 5 HD channel feature licenses, because the licenses were not added in the grace period. With the same use case, if the request for the upgraded license is received at a time within the grace period (for example, a grace period of 15 days, with the request being received on Sep. 25, 2018), the 5 HD 9 month channels can be added without consuming any feature credits. While this policy may be subject to possible abuse (which can be monitored and acted on by forbidding future use of this policy for those that abuse it), it helps to ameliorate the limits imposed by having a fixed license temporal term.

Figure 10:
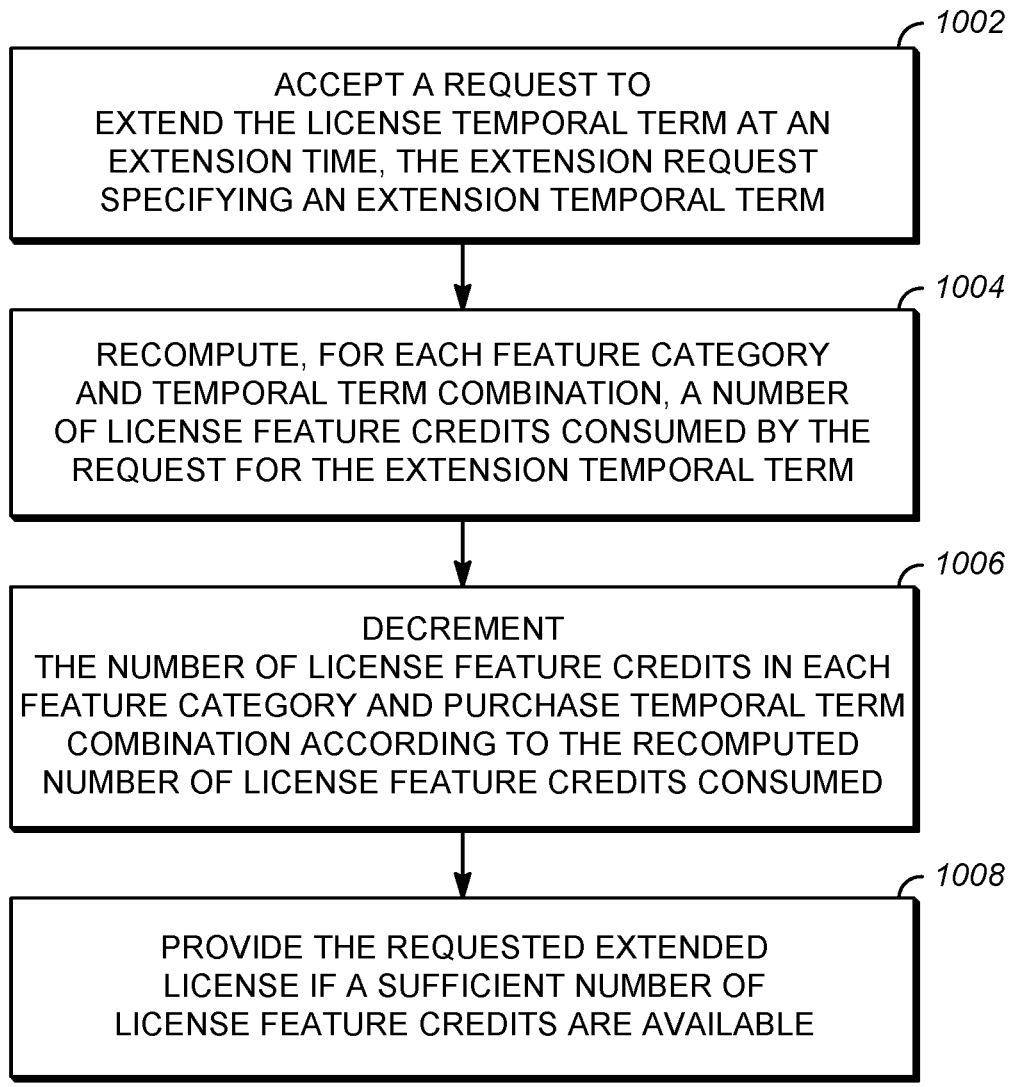
FIG. 10 is a diagram depicting, for the separate single unit fixed term credit case, exemplary operations for extending the subscriptions in a current license for the separate single unit fixed term credit embodiment.

FIG. 10 is a diagram depicting, for the separate single unit fixed term credit case, exemplary operations for extending the subscriptions in a current license for the separate single unit fixed term credit embodiment. In block 1002 a request to extend the license temporal term is accepted at an extension time, the extension request specifying an extension temporal term. In block 1004, the number of feature license credits consumed by the request for the extended temporal term is recomputed for each feature category and temporal term combination, and compared to a number of current license feature credits for each relevant feature category and temporal term combination. If the number of current license feature credits in any feature category and temporal term combination are insufficient, additional license feature credits in the appropriate feature category and temporal term combination must be purchased. Block 1006 decrements the number of license feature credits in each feature category and temporal term combination according to the recomputed number of license feature credits consume. Block 1008 provides the requested extended license if a sufficient number of license feature credits are available.

For example, in the above case, a license was initially granted for DRM and 10 HD channels starting on Jan. 1, 2018, and expiring on Sep. 30, 2108. At any time before Sep. 30, 2018, (for example, Jul. 15, 2018) it may be desired to extend the current license so that it expires 9 additional months later (e.g. Jun. 30, 2019). Note that in this embodiment, since the PN definitions provides that only 9 month term licenses are available for HD channel feature license such extension must be in increments of 9 months. This will consume an additional 1 credit of 9 months of the DRM feature, and 10 credits of 9 months of the 1 HD channel feature license. If there are insufficient license DRM credits and license feature HD channel credits to satisfy this request, additional credits must be purchased according to the specified paradigm. In the above example DRM feature licenses may be purchase for only increments of 9 months, HD channels can only be purchased for 9 months, but no other temporal terms). Presuming such purchases are made, an upgraded or new license is provided that includes DRM and 10 HD channels beginning at the specified time (e.g. Jul. 15, 2018) and extending to Jun. 30, 2019.

Figure 11:
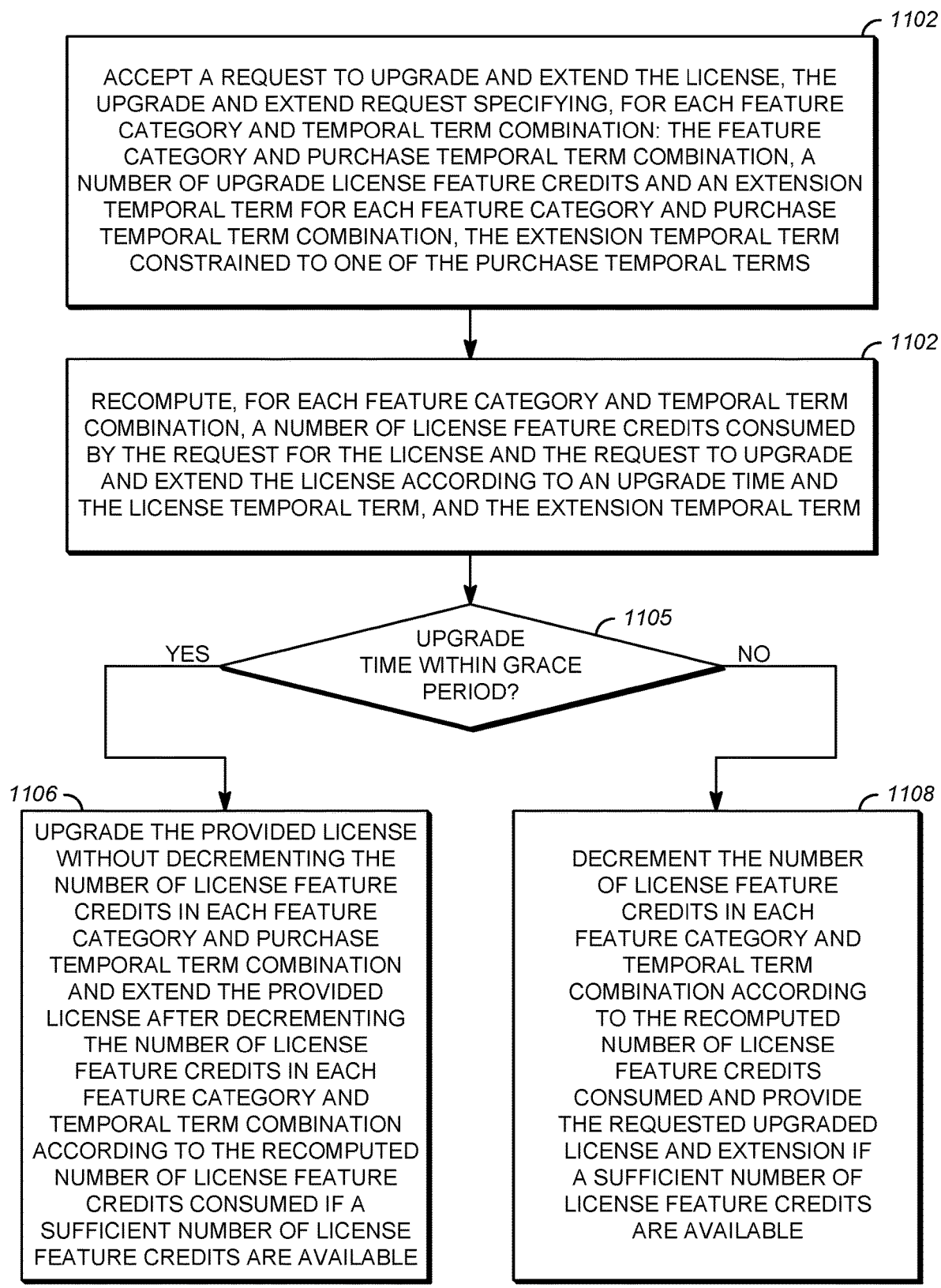
FIG. 11 is a diagram depicting, for the separate single unit fixed term credit case, exemplary operations for upgrading the initial license and extending the upgraded subscriptions in the license.

FIG. 11 is a diagram depicting, for the separate single unit fixed term credit case, exemplary operations for upgrading the initial license and extending the upgraded subscriptions in the license. In block 1102, a request is accepted to upgrade and extend the license. The request specifies, for each feature category and temporal term combination, at least: (1) the feature category and temporal term combination, (2) a number of upgrade license feature credits and (3) an extension temporal term. The request may also specify an upgrade time (at which the upgrades are to apply). For example, in the previous example of an existing initial license to DRM and 10 HD channels from Jan. 1, 2018 to Sep. 30, 2018, we consider a request made to add 5 HD channels and extend the license for 6 months.

Block 1104 recomputes, for each feature category and purchase temporal term combination, a number of license feature credits consumed by the request for the license and the request to upgrade and extend the license according to the number of upgrade license feature credits in each feature category and temporal term combination (in the foregoing example, 5 HD channels) upgrade time (in the foregoing example, Sep. 5, 2018), the license temporal term and the extension temporal term (in the foregoing example, 6 months). Block 1105 determines if the requested upgrade is to be effective within the grace period. If not, processing is passed to block 1106, which decrements the number of license feature credits in each feature category and purchase temporal term combination according to the recomputed number of license feature credits consumed. If a sufficient number of license feature credits are available in each category and purchase temporal term combination, the decrementing of the number of license feature credits in each feature category and purchase temporal term combination is committed, and the upgraded and extended license is provided, as shown in block 1108. If an insufficient number of license feature credits are available, the requestor is given an opportunity to purchase additional license feature credits in the associated feature category/purchase temporal term combination. Referring back to the foregoing example, if the requested upgrade is to be effective outside of the grace period, adding the 5 HD channel feature licenses consumes 5 credits of 9 months of 1 HD channel feature license, and extending the license 6 additional months consumes 1 credit of the 6 months DRM feature license and 10+5=15 credits of the 6 month 1 channel HD feature license. The resulting license provides a DRM feature license and 15 HD channel feature licenses that begins on the date provided in the request and expires 6 months after the original expiration date of Sep. 30, 2018 (e.g. Mar. 31, 2019). For example, if the upgrade is requested to begin on Apr. 20, 2018 (outside a 15 day grace period), the customer is charged full-term credits when far into the current license term (here, the customer is charged for 9 months of the newly added 5 HD channels four and a half months into the license and outside the 15 day grace period, even though the newly added 5 HD channels will only be active for the remaining four and a half months of the 9 month term).

On the other hand, if the requested upgrade is to be effective on Sep. 25, 2018 (e.g. less than 15 days before the expiration of the initial license and during the grace period), processing is routed to block 1108 which upgrades the provided license without decrementing the number of license feature credits in each feature category and purchase temporal term combination, and, if a sufficient number of license feature credits are available, extends the provided license after decrementing the number of license feature credits in each feature category and temporal term combination according to the recomputed number of feature license credits consumed. Returning to the above example, in this case, adding the 5 additional HD channels does not consume any credits (e.g. the customer receives 5 days of 5 additional HD channels for without charge), and the extension of the license for 6 months (which must be one of the terms defined in the PNs which, in this case, is either 6 months or 9 months), consumes 1 credit of 6 months of the DRM license and 10+5=15 credits of 6 months of 1 HD channel feature license. The resulting license provides DRM and 15 HD channels, and begins on Sep. 25, 2018, and extends to Mar. 31, 2019, or 6 months past the original expiration date of Sep. 30, 2018. The requested upgrades are provided without decrementing the number of HD channel license feature credits, even though the license to such feature credits is granted before the original license expires (essentially providing the 5 HD channels for 5 days at no cost).

Figure 12:
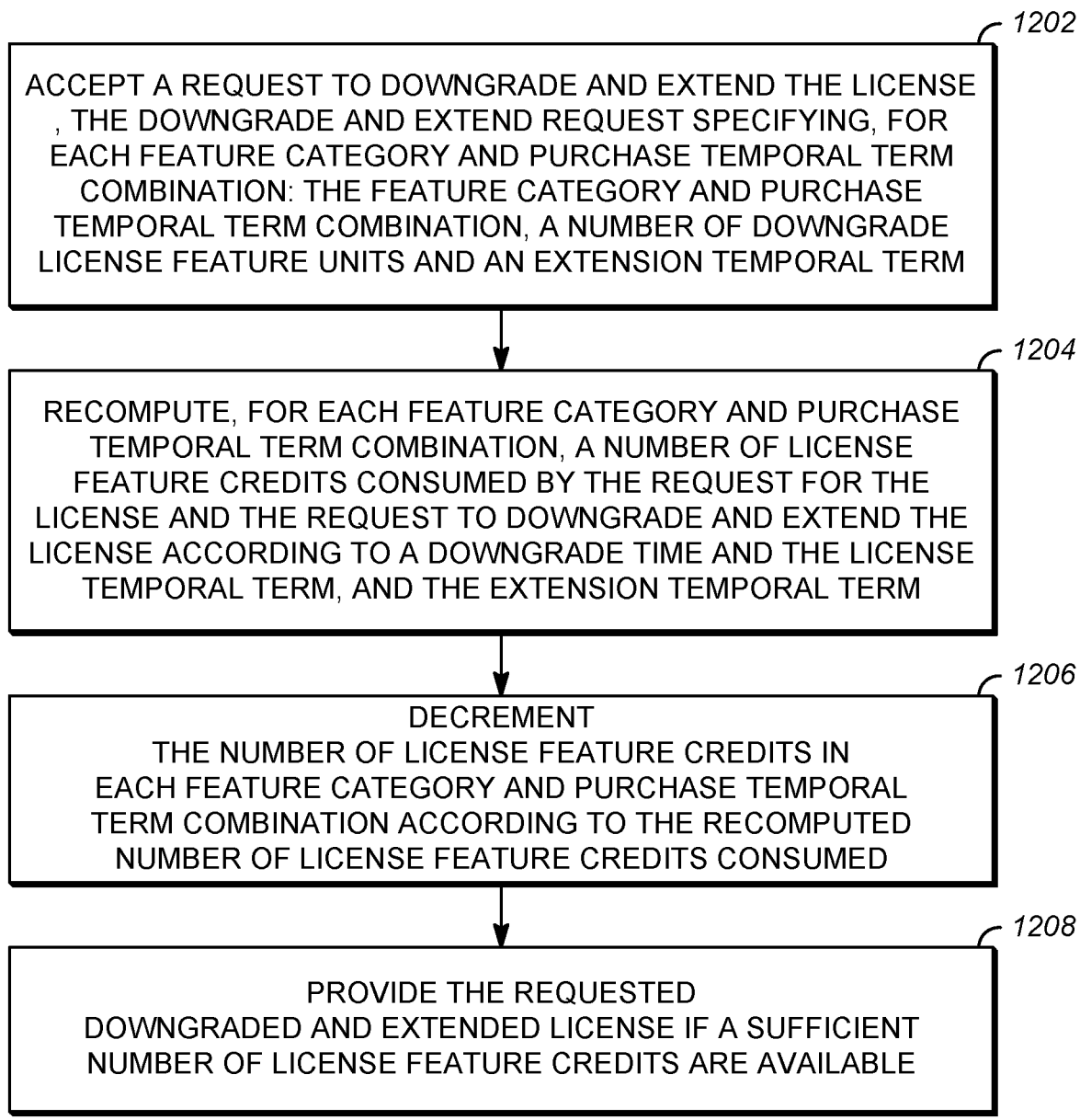
FIG. 12 is a diagram depicting, for the separate single unit fixed term credit case, exemplary operations to downgrade and extend the initial license.

FIG. 12 is a diagram depicting, for the separate single unit fixed term credit case, exemplary operations to downgrade and extend the initial license. In block 1202, a request is accepted to downgrade and extend the initial license. The downgrade and extend request specifies, for each feature category and purchase temporal term combination, the feature category and temporal term combination, a number of downgrade license feature units, and an extension temporal term. For example, in the previous example of an existing initial license to DRM and 10 HD channels from Jan. 1, 2019 to Sep. 30, 2018, we consider a request to remove 5 DRM feature license and the feature license for 3 HD channels, while extending the resulting license for 6 months. In one embodiment, no credit refund is provided, in which case removing the DRM feature license does not result in a DRM feature credits being added to a DRM feature credit pool.

Block 1204 recomputes, for each feature category a number of license feature credits consumed by the request for the license and the request to downgrade and extend the license according to the downgrade time, the license temporal term, and the extension temporal term. As described above, this embodiment may or may not provide for refund of feature credits. If refunds are provided, the number of downgrade feature credits in each feature category and temporal term combination is also included in the recomputation. Block 1206 decrements the number of license feature credits in each feature category and temporal term combination according to the recomputed number of license feature credits consumed for the extension. If a sufficient number of license feature credits are available in each category, the decrementing of the number of license feature credits in each feature category and temporal term combination is committed, and the upgraded and extended license is provided, as shown in block 1208. If an insufficient number of license feature credits are available, the requestor may be given an opportunity to purchase additional license feature credits in the associated feature categories. Turning to the foregoing example, removing the DRM feature license and 3 HD channels, and extending the remaining HD feature licenses for 6 months consumes zero credits of DRM feature license credits and 10−3=7 credits of 6 month of HD channel feature license credits. The new license provides no DRM feature license, but 7 HD channel feature licenses that starts on the downgrade time (in this case, Sep. 15, 2018) and ends 6 months after Sep. 30, 2018, or Mar. 31, 2019.

As noted above, the foregoing downgrade use case does not permit refunds of unused feature license credits. In another embodiment, a credit refund option may be provided in downgrade use cases, with unused feature license credit term credited back to the feature license credits. In this case, a license confirmation file that verifies the downgraded license installation may be generated on the licensed device. In one embodiment the final feature license credits refunded are based on the information (e.g. the installation date) provided in the license confirmation file. For example, consider the case above where an initial license 10 HD channel feature licenses is provided from Jan. 1, 2018 to Jun. 30, 2019. Further assume that the license was provided by a first term from Jan. 1, 2018 to Sep. 30, 2018, which consumes 10 credits of 9 months of 1 HD channel feature license, and a second term from Oct. 1, 2018 to Jun. 30, 2019 consumes 10 credits of 9 months of 1 HD channel feature license. At this time, the existing license provides for 10 HD channels, and extends from Jan. 1, 2018 through Jun. 30, 2019. If a request to remove 3 HD channel feature license credits is specified for any time after Jan. 1, 2018, and before Sep. 30, 2018 (for example, on Jul. 15, 2018, no HD feature license credits are refunded for the current license period (first term between Jan. 1, 2018, and September 2018), but 3 HD feature license credits may be refunded for the future license period (the second term of Oct. 1, 2018 to Jun. 30, 2018). The new license will have 7 HD channel feature licenses that begin on the license generation date (Jul. 15, 2018) and expiring on the expiration of the second term or Jun. 30, 2019.

Summary

Table I presents substantive differences between the mixed single unit monthly credit and separate single unit fixed term credit feature licensing paradigms.

TABLE I

| | Mixed Single Unit Monthly Credit | Separate Single Unit Fixed Term Credit |
|---|---|---|
| Part Definition | Different terms can be offered across different subscription-eligible features/capacities | If a term is offered on one feature/capacity, the same term must be offered on all subscription-eligible features/capacities. |

TABLE I-continued

| | Mixed Single Unit Monthly Credit | Separate Single Unit Fixed Term Credit |
|---|---|---|
| Subscription Rules | Allowed initial and subsequent subscription periods do not have to be among the terms defined for parts. | Allowed Initial and subsequent subscription periods have to be among the terms defined for parts. |
| Grace Period | No need for any grace period | A grace period must be defined for no-cost upgrade close to the end of a subscription period. |
| Credit Pooling | Credits from orders for different terms of the same feature/capacity broken into monthly credits and mixed into the same credit pool. | Credits from orders for different terms of the same feature/capacity kept in separate pools for the ordered terms. |
| Part Usage Tracking | Not possible to track how many parts are actually used. | Possible to track how many parts are actually used. |
| Credit Consumption (for upgrades before the current expiration) | Upgrade for the remainder of the current subscription period consumes the amount of monthly credits based on how many months are left. When determining the number of months left, partial month has to be rounded up or down. | Upgrade for the remainder of the current subscription period outside the grace period consumes full-term credits. Discounts may have to be given when selling full-term credits for the purpose of upgrading in the middle of a subscription period. Upgrade for the remainder of the current subscription period inside the grace period consumes no credit. |
| Credit Conversion (from one term to another) | N/A | Allowed on PLM's discretion and through credit adjustments per PLM instruction |
| Credit Cross-use (by license with different term) | N/A | Not allowed at license generation time. |

Note that the part definitions are such that in the Mixed Single Unit Monthly Credit (MSUMC) Paradigm, different feature license temporal terms can be offered across different subscription-eligible feature/capacities. This is because they are all pooled on a per unit time (e.g. month basis). However, in the Separate Single Unit Fixed Term Credit (SSUFC) paradigm, if a term (e.g. 9 months) is offered on one feature/capacity (such as a DRM feature license), the same temporal term must be offered on all subscription eligible features that are to be generated in the same license. In other words, if a license is to be generated with both DRM feature license and an HD channel feature license for a term of 9 months, both DRM feature license and HD channel feature license must offer the 9 month term.

Also note that in the MSUMC paradigm, the subscription rules do not require that the initial and subsequent subscription periods do not have to be among the temporal terms described for parts. In other words, if a 6 month HD channel feature license is purchased, that can be converted to a 6 one month HD channel feature license units and used extend or shorten the feature license, or to add additional units for more devices. Such extensions can be for less or more of a temporal term than the original term of 6 months. On the other hand, the SSUFC subscription rules demand that the initial and subsequent subscription periods must be among the temporal terms defined for the parts. Therefore, only a 6 or 9 month initial subscription period may be selected if the parts have only a 6 or 9 month initial subscription period.

Since feature license credits are pooled on a unit time basis (e.g. monthly), there is little or need for grace periods in the MSUMC paradigm. However, in the SSUFC paradigm, a grace period may be defined for no-cost upgrades at the end of the initial subscription period. This can help ameliorate some of the adverse effects of the subscription rules.

With regard to credit pooling, in the MSUMC paradigm, credits from orders of different terms of the same feature/capacity are broken down into credits of unit time (e.g. monthly) and mixed into the same credit pool. In the SSUFC paradigm, credits from orders for different terms of the same feature/capacity are kept in separate pools. For example, five 9 month temporal term DRM feature licenses cannot be combined or pooled with three 6 month temporal term DRM feature licenses. Instead, pooling may only be done so that feature licenses having the same feature and temporal term (feature and temporal term combination).

With the MSUMC paradigm, it is more difficult to track how many parts are actually used, as the distinction between parts are blurred when the credit pooling takes place. However, with the SSUFC paradigm, it is possible to track how many part numbers are used without attempting to reconstruct past transactions.

The MSUMC and SSUFC paradigms also differ in how credits are consumed in instances where upgrades are requested before the initial (or current) license expires. In the MSUMC paradigm, the upgrade for the remainder of the current subscription period consumes an amount of monthly credits based on how many months remain. When determining the number of monthly units remain in each pool, partial months may be rounded up or down. With the SSUFC paradigm, upgrades for the remainder of the current subscription period outside of the grace period consumes full-term credits. Discounts can be given when selling full-term credits for the purpose of upgrading in the middle of a subscription period and outside of the grace period. Upgrades for the remainder of the current subscription period inside the grace period may be accomplished without consuming additional credits.

Finally, the MSUMC paradigm does not require credit conversions from one term to another, and such credit conversion is allowed in the SSUFC paradigm, according to the PLM's discretion and through credit adjustments if the PLM instructs. Credit cross use among feature licenses with different temporal terms is not needed in the MSUMC paradigm, and not permitted in the SSUFC paradigm.

Hardware Environment

Figure 13:
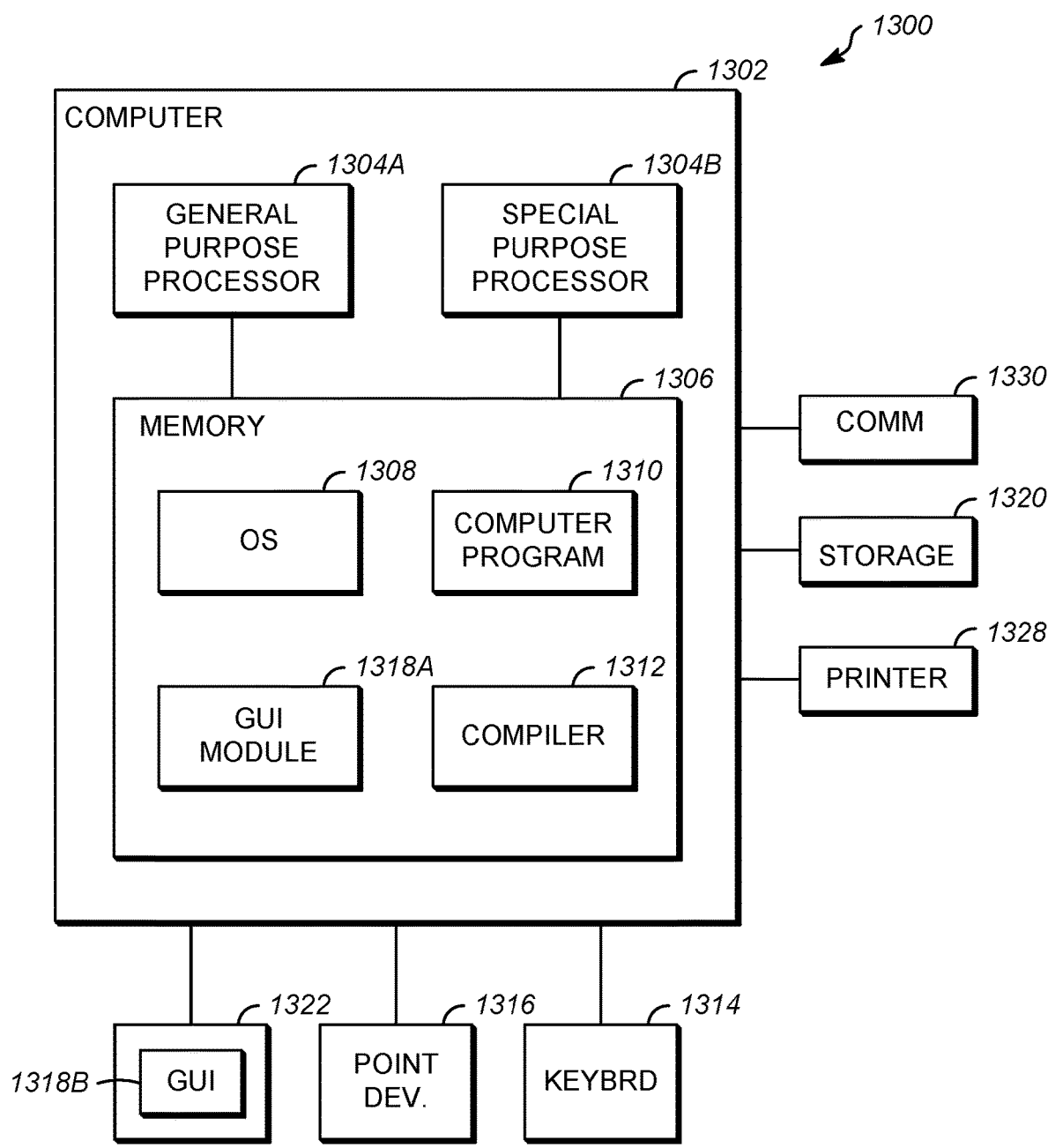
FIG. 13 illustrates an exemplary computer system 1300 that could be used to implement processing elements of the licensing system.

FIG. 13 illustrates an exemplary computer system 1300 that could be used to implement processing elements of the above disclosure, including the deployed devices 108, customer proxy servers 106, ULS 102, factory license servers 104, and order management system 116. The computer 1302 comprises a processor 1304 and a memory, such as random access memory (RAM) 1306. The computer 1302 is operatively coupled to a display 1322, which presents images such as windows to the user on a graphical user interface 1318B. The computer 1302 may be coupled to other devices, such as a keyboard 1314, a mouse device 1316, a printer 1328, etc. Of course, those skilled in the art will recognize that any combination of the above components, or any number of different components, peripherals, and other devices, may be used with the computer 1302.

Generally, the computer 1302 operates under control of an operating system 1308 stored in the memory 1306, and interfaces with the user to accept inputs and commands and to present results through a graphical user interface (GUI) module 1318A. Although the GUI module 1318B is depicted as a separate module, the instructions performing the GUI functions can be resident or distributed in the operating system 1308, the computer program 1310, or implemented with special purpose memory and processors. The computer 1302 also implements a compiler 1312 which allows an application program 1310 written in a programming language such as COBOL, C++, FORTRAN, or other language to be translated into processor 1304 readable code. After completion, the application 1310 accesses and manipulates data stored in the memory 1306 of the computer 1302 using the relationships and logic that was generated using the compiler 1312. The computer 1302 also optionally comprises an external communication device such as a modem, satellite link, Ethernet card, or other device for communicating with other computers.

In one embodiment, instructions implementing the operating system 1308, the computer program 1310, and the compiler 1312 are tangibly embodied in a computer-readable medium, e.g., data storage device 1320, which could include one or more fixed or removable data storage devices, such as a zip drive, floppy disc drive, hard drive, CD-ROM drive, tape drive, etc. Further, the operating system 1308 and the computer program 1310 are comprised of instructions which, when read and executed by the computer 1302, causes the computer 1302 to perform the operations herein described. Computer program 1310 and/or operating instructions may also be tangibly embodied in memory 1306 and/or data communications devices 1330, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure.

The foregoing discloses an apparatus, method, and system for managing distribution of at least one license to one or more features defined in feature categories. The method includes accepting a purchase request, the purchase request specifying a plurality of feature purchases, each feature purchase defining a number of purchase feature units and a purchase temporal term, and each feature belonging to one of the feature categories; pooling the feature purchases within each feature category to a number of purchase feature credits of a uniform credit temporal term; accepting a request for a license, the request specifying a license temporal term, and the request including, for each license request feature category the feature category; a number of license feature units. The method also includes computing, for each license request feature category, a number of license feature credits consumed by the request for the license, according to a start date and the license temporal term; decrementing the number of purchase feature credits in each feature category according to the number of license feature credits consumed in the feature category, and providing the requested license if a sufficient number of license feature credits are available in each feature category Implementations may include one or more of the following features:

The above method, wherein the requested license expires after the license temporal term for all feature categories.

Any of the methods described above, wherein the purchase temporal term of each feature purchase differs from at least one of other temporal terms of a same feature purchase.

Any of the methods described above, wherein the purchase temporal term of a feature purchase of a first feature differs from the purchase temporal term of another feature purchase of a second feature.

Any of the methods described above, further including accepting a request for an upgrade to the license at an upgrade time, the upgrade request specifying, for each feature category the feature category; and a number of upgrade license feature units; recomputing, for each feature category, a number of license feature credits consumed by the request for the license and the request for the upgrade to the license according to the upgrade time and the license temporal term; decrementing the number of license feature credits in each feature category according to the recomputed number of license feature credits consumed; and providing the requested upgraded license if a sufficient number of license feature credits are available.

Any of the methods described above, further including accepting a request to extend the license temporal term at an extension time, the extension request specifying an extension temporal term; recomputing, for each feature category, a number of license feature credits consumed by the request for the extension temporal term; decrementing the number of license feature credits in each feature category according to the recomputed number of license feature credits consumed; and providing the requested extended license if a sufficient number of license feature credits are available.

Any of the methods described above, further including accepting a request to upgrade and extend the license, the upgrade and extend request specifying, for each feature category the feature category; a number of upgrade license feature units; and an extension temporal term; recomputing, for each feature category, a number of license feature credits consumed by the request for the license and the request to upgrade and extend the license according to an upgrade time and the license temporal term, and the extension temporal term; decrementing the number of license feature credits in each feature category according to the recomputed number of license feature credits consumed; and providing the requested upgraded license and extension if a sufficient number of license feature credits are available.

Any of the methods described above, further including accepting a request to downgrade and extend the license, the downgrade and extend request specifying, for each feature category the feature category; a number of downgrade license feature units; and an extension temporal term; recomputing, for each feature category, a number of license feature credits consumed by the request for the license and the request to downgrade and extend the license according to a downgrade time and the license temporal term, and the extension temporal term; decrementing the number of license feature credits in each feature category according to the recomputed number of license feature credits consumed; and providing the requested downgraded and extended license if a sufficient number of license feature credits are available.

Any of the methods described above, further including incrementing the number of license feature credits in each feature category according to the recomputed number of license feature credits consumed.

Any of the methods described above, wherein each purchase temporal term is one of a limited set of purchase temporal terms; the purchase temporal term of a feature purchase of any of the feature categories must be an offered temporal term of another feature purchase of another feature for a request for a license; the feature purchases are pooled according to a combination of purchase temporal term and feature category; wherein the number of license feature credits consumed by the request for the license is computed for each feature category and purchase temporal term combination; and wherein the number of license feature credits are decremented in each feature category and purchase temporal term combination according to the number of license feature credits consumed in the feature category and purchase temporal term combination.

Any of the methods described above, wherein accepting a request for an upgrade to the license at an upgrade time, the upgrade request specifying, for each feature category and purchase temporal term combination the feature category purchase and temporal term combination; and a number of upgrade license feature units; recomputing, for each feature category and purchase temporal term combination, a number of license feature credits consumed by the request for the license and the request for an upgrade to the license according to the upgrade time and the license temporal term; determining if the upgrade time is within a grace period; and if the upgrade time is within the grace period providing the requested upgraded license without decrementing the number of license feature credits in each feature category and purchase temporal term combination; and if the upgrade time is not within the grace period decrementing the number of license feature credits in each feature category and purchase temporal term combination according to the recomputed number of license feature credits consumed; and providing the requested upgraded license if a sufficient number of license feature credits are available.

Any of the methods described above, further including accepting a request to extend the license temporal term at an extension time, the extension request specifying an extension temporal term; recomputing, for each feature category and purchase temporal term combination, the license feature credits consumed by the request for the extension temporal term, wherein the extension temporal term is constrained to one of the purchase temporal terms; decrementing, the number of license feature credits in each feature category and purchase temporal term combination according to the recomputed number of feature license credits consumed; and providing the requested extended license if a sufficient number of license feature credits are available.

Any of the methods described above, further including accepting a request to upgrade and extend the license, the upgrade and extend request specifying, for each feature category the feature category and purchase temporal term combination; a number of upgrade license feature units; and an extension temporal term for each feature category and purchase temporal term combination, the extension temporal term constrained to one of the purchase temporal terms; recomputing, for each feature category and purchase temporal term combination, the number of license feature credits consumed by the request for the license and the request to upgrade and extend the license according to an upgrade time, and the license temporal term, and the extension temporal term; decrementing the number of license feature credits in each feature category and temporal term combination according to the recomputed number of license feature credits consumed; and determining if the upgrade time is within a grace period; if the upgrade time is within the grace period providing the upgraded and extended license, wherein the upgraded and extended license upgrades the provided license without decrementing the number of license feature credits in each feature category and purchase temporal term combination; and extends the provided license after decrementing the number of license feature credits in each feature category and temporal term combination according to the recomputed number of license feature credits consumed.

Any of the methods described above, further including accepting a request to downgrade and extend the license, the downgrade and extend request specifying, for each feature category and purchase temporal term combination the feature category and purchase temporal term combination; a number of downgrade license feature units; and an extension temporal term for each feature category and purchase temporal term combination recomputing, for each feature category and purchase temporal term combination, the number of license feature credits consumed by the request for the license and the request to downgrade and extend the license according to a downgrade time, and the license temporal term, and the extension temporal term; decrementing the number of license feature credits in each feature category and purchase temporal term combination according to the recomputed number of license feature credits consumed; and providing the requested downgraded and extended license if a sufficient number of license feature credits are available.

Any of the methods described above, wherein the recomputing provides no refund of license feature credits for downgraded license feature units.

Any of the methods described above, wherein the recomputing provides a refund of license feature credits for downgraded license feature units.

Another embodiment is evidenced by a an apparatus for managing distribution of at least one license to one or more features defined in feature categories. The apparatus also includes a processor; a memory, communicatively coupled to the processor, the memory storing processor instructions including processor instructions for performing the methods described above.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of managing distribution of at least one license to one or more features defined in feature categories using a computing device that includes a processor, comprising:
    accepting a purchase request, the purchase request specifying a plurality of feature purchases which are included in a plurality of different said feature categories, each feature purchase defining a respective number of purchase feature units and a purchase temporal term for each of said plurality of said feature categories, where a plurality of features units for different features are included within the same feature category, where each of said plurality of different features included within the same feature category share said respective number of purchase features units and said purchase temporal time, and each feature belonging to only one of the feature categories;
    pooling the feature purchases within each feature category to a number of purchase feature credits of a uniform credit temporal term, where said respective number of purchase feature units for a first plurality of different said features correspond to a first said feature category, where said respective number of purchase feature units for a second plurality of different said features correspond to a second said feature category, where said first feature category corresponds to a first set of features not included in said second feature category which corresponds to a second set of features;
    accepting a request for a license, the request specifying a license temporal term of temporal duration, and the request for the license comprising, for each license request feature category:
        the feature category from among a plurality different said feature categories;
        a number of license feature units within the respective feature category where a first set of license feature units for a respective first said feature category is attributed against a first pool of license feature units for said first feature category and where a second set of license feature units for a respective second said feature category is attributed against a second pool of license feature units for said first feature category, where said first pool of license feature units is separate from said second pool of license feature units;
    computing, for each license request feature category, a number of license feature credits consumed by the respective request for the license, according to a start date and the license temporal term of said temporal duration separately for each said feature category;
    decrementing the number of purchase feature credits in each feature category from a respective pool of feature license units for a particular feature category according to the number of license feature credits consumed in the respective feature category; and
    selectively providing the requested license for a respective pool of feature license units for a particular feature category based upon where a sufficient number of license feature credits are available in each feature category such that a corresponding computing device uses the requested license to active corresponding features.

2. The method of claim 1, wherein the requested license expires after the license temporal term for all feature categories.

3. The method of claim 1, wherein:
    the purchase temporal term of each feature purchase differs from at least one of other temporal terms of a same feature purchase.

4. The method of claim 1, wherein:
    the purchase temporal term of a feature purchase of a first feature differs from the purchase temporal term of another feature purchase of a second feature.

5. The method of claim 1, further comprising:
    accepting a request for an upgrade to the license at an upgrade time, the upgrade request specifying, for each feature category:
        the feature category; and
        a number of upgrade license feature units;
    recomputing, for each feature category, a number of license feature credits consumed by the request for the license and the request for the upgrade to the license according to the upgrade time and the license temporal term;
    decrementing the number of license feature credits in each feature category according to the recomputed number of license feature credits consumed; and
    providing the requested upgraded license if a sufficient number of license feature credits are available.

6. The method of claim 1, further comprising:
    accepting a request to extend the license temporal term at an extension time, the extension request specifying an extension temporal term;
    recomputing, for each feature category, a number of license feature credits consumed by the request for the extension temporal term;
    decrementing the number of license feature credits in each feature category according to the recomputed number of license feature credits consumed; and
    providing the requested extended license if a sufficient number of license feature credits are available.

7. The method of claim 1, further comprising:
    accepting a request to upgrade and extend the license, the upgrade and extend request specifying, for each feature category:
        the feature category;
        a number of upgrade license feature units; and
        an extension temporal term;
    recomputing, for each feature category, a number of license feature credits consumed by the request for the license and the request to upgrade and extend the license according to an upgrade time and the license temporal term, and the extension temporal term;
    decrementing the number of license feature credits in each feature category according to the recomputed number of license feature credits consumed; and
    providing the requested upgraded license and extension if a sufficient number of license feature credits are available.

8. The method of claim 1, further comprising:
    accepting a request to downgrade and extend the license, the downgrade and extend request specifying, for each feature category:
        the feature category;
        a number of downgrade license feature units; and
        an extension temporal term;
    recomputing, for each feature category, a number of license feature credits consumed by the request for the license and the request to downgrade and extend the license according to a downgrade time and the license temporal term, and the extension temporal term;
decrementing the number of license feature credits in each feature category according to the recomputed number of license feature credits consumed; and
providing the requested downgraded and extended license if a sufficient number of license feature credits are available.

9. The method of claim 8, further comprising:
incrementing the number of license feature credits in each feature category according to the recomputed number of license feature credits consumed.

10. The method of claim 1, wherein:
each purchase temporal term is one of a limited set of purchase temporal terms;
the purchase temporal term of a feature purchase of any of the feature categories must be an offered temporal term of another feature purchase of another feature for a request for a license;
the feature purchases are pooled according to a combination of purchase temporal term and feature category;
wherein the number of license feature credits consumed by the request for the license is computed for each feature category and purchase temporal term combination; and
wherein the number of license feature credits are decremented in each feature category and purchase temporal term combination according to the number of license feature credits consumed in the feature category and purchase temporal term combination.

11. The method of claim 10, wherein:
accepting a request for an upgrade to the license at an upgrade time, the upgrade request specifying, for each feature category and purchase temporal term combination:
the feature category purchase and temporal term combination; and
a number of upgrade license feature units;
recomputing, for each feature category and purchase temporal term combination, a number of license feature credits consumed by the request for the license and the request for an upgrade to the license according to the upgrade time and the license temporal term;
determining if the upgrade time is within a grace period; and
if the upgrade time is within the grace period:
providing the requested upgraded license without decrementing the number of license feature credits in each feature category and purchase temporal term combination; and
if the upgrade time is not within the grace period:
decrementing the number of license feature credits in each feature category and purchase temporal term combination according to the recomputed number of license feature credits consumed; and
providing the requested upgraded license if a sufficient number of license feature credits are available.

12. The method of claim 10, further comprising:
accepting a request to extend the license temporal term at an extension time, the extension request specifying an extension temporal term;
recomputing, for each feature category and purchase temporal term combination, the license feature credits consumed by the request for the extension temporal term, wherein the extension temporal term is constrained to one of the purchase temporal terms;
decrementing, the number of license feature credits in each feature category and purchase temporal term combination according to the recomputed number of feature license credits consumed; and
providing the requested extended license if a sufficient number of license feature credits are available.

13. The method of claim 10, further comprising:
accepting a request to upgrade and extend the license, the upgrade and extend request specifying, for each feature category:
the feature category and purchase temporal term combination;
a number of upgrade license feature units; and
an extension temporal term for each feature category and purchase temporal term combination, the extension temporal term constrained to one of the purchase temporal terms;
recomputing, for each feature category and purchase temporal term combination, the number of license feature credits consumed by the request for the license and the request to upgrade and extend the license according to an upgrade time, and the license temporal term, and the extension temporal term;
decrementing the number of license feature credits in each feature category and temporal term combination according to the recomputed number of license feature credits consumed; and
determining if the upgrade time is within a grace period;
if the upgrade time is within the grace period:
providing the upgraded and extended license, wherein the upgraded and extended license:
upgrades the provided license without decrementing the number of license feature credits in each feature category and purchase temporal term combination; and
extends the provided license after decrementing the number of license feature credits in each feature category and temporal term combination according to the recomputed number of license feature credits consumed.

14. The method of claim 10, further comprising:
accepting a request to downgrade and extend the license, the downgrade and extend request specifying, for each feature category and purchase temporal term combination:
the feature category and purchase temporal term combination;
a number of downgrade license feature units; and
an extension temporal term for each feature category and purchase temporal term combination:
recomputing, for each feature category and purchase temporal term combination, the number of license feature credits consumed by the request for the license and the request to downgrade and extend the license according to a downgrade time, and the license temporal term, and the extension temporal term;
decrementing the number of license feature credits in each feature category and purchase temporal term combination according to the recomputed number of license feature credits consumed; and
providing the requested downgraded and extended license if a sufficient number of license feature credits are available.

15. The method of claim 14, wherein:
the recomputing provides no refund of license feature credits for downgraded license feature units.

16. The method of claim 14, wherein:
the recomputing provides a refund of license feature credits for downgraded license feature units.

\* \* \* \* \*